(12) United States Patent
Cho et al.

(10) Patent No.: US 10,129,045 B2
(45) Date of Patent: Nov. 13, 2018

(54) GROUP WISE DEVICE MANAGEMENT SYSTEM AND METHOD

(71) Applicant: Samsung Electronics Co., Ltd., Suwon-si, Gyeonggi-do (KR)

(72) Inventors: Hyungrae Cho, Seoul (KR); Jihyeon Kweon, Yongin-si (KR); Seokmin Oh, Gyeonggi-do (KR); Kangmin Lee, Gyeonggi-do (KR); Yousef Kharsim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 427 days.

(21) Appl. No.: 13/629,011

(22) Filed: Sep. 27, 2012

(65) Prior Publication Data

US 2013/0082827 A1    Apr. 4, 2013

(30) Foreign Application Priority Data

Sep. 30, 2011    (KR) ........................ 10-2011-0100203

(51) Int. Cl.
| | |
|---|---|
| *G05B 11/01* | (2006.01) |
| *G08C 19/12* | (2006.01) |
| *G08C 19/16* | (2006.01) |
| *H04Q 5/22* | (2006.01) |
| *H02J 13/00* | (2006.01) |
| *H04Q 1/30* | (2006.01) |
| *G05B 23/02* | (2006.01) |
| *G09B 21/00* | (2006.01) |
| *H04L 7/00* | (2006.01) |
| *G08B 5/00* | (2006.01) |
| *H04L 12/28* | (2006.01) |

(Continued)

(52) U.S. Cl.
CPC ........ *H04L 12/2814* (2013.01); *H04L 12/282* (2013.01); *H04L 41/0853* (2013.01); *H04L 41/0873* (2013.01); *H04L 41/0893* (2013.01); *H04N 21/4131* (2013.01); *H04N 21/422* (2013.01)

(58) Field of Classification Search
CPC ............. H04L 12/2814; H04L 12/2803; H04L 12/282; H04N 21/422; H04N 21/4131; G08C 17/02
USPC ............................ 340/12.1–12.39; 455/41–43
See application file for complete search history.

(56) References Cited

U.S. PATENT DOCUMENTS 6,421,069 B1 *   7/2002   Ludtke et al. ................ 715/762
6,466,234 B1 *   10/2002   Pyle et al. .................... 715/771
(Continued)

FOREIGN PATENT DOCUMENTS

| | | |
|---|---|---|
| EP | 1 753 200 | 2/2007 |
| JP | 2006-099735 | 4/2006 |

(Continued)

OTHER PUBLICATIONS

Translation of JP 2007-237300 A, Pertinent pp. Whole Document.*

(Continued)

*Primary Examiner* — Steven Lim
*Assistant Examiner* — Muhammad Adnan
(74) *Attorney, Agent, or Firm* — The Farrell Law Firm, P.C.

(57) ABSTRACT

Methods and apparatus are provided for group-controlling devices. Group information on interoperable devices among a plurality of electronic devices is acquired. The interoperable devices indicated in the group information are controlled as a group.

12 Claims, 19 Drawing Sheets

(51) Int. Cl.
*H04L 12/24* (2006.01)
*H04N 21/41* (2011.01)
*H04N 21/422* (2011.01)

(56) References Cited

U.S. PATENT DOCUMENTS

| | | | | |
|---|---|---|---|---|
| 6,574,798 B1* | 6/2003 | Bradley | ............... | H04N 7/165 340/4.37 |
| 6,622,018 B1* | 9/2003 | Erekson | ............... | 455/420 |
| 6,737,761 B2* | 5/2004 | Ishida | ............... | H02J 3/14 307/41 |
| 6,747,590 B1* | 6/2004 | Weber | ............... | G08C 23/04 340/12.28 |
| 7,093,003 B2* | 8/2006 | Yuh | ............... | G06F 8/65 709/219 |
| 7,499,762 B2* | 3/2009 | Khorramshahi | ...... | H04L 67/125 340/870.07 |
| 7,831,959 B1* | 11/2010 | Perry | ............... | G06F 9/44505 717/121 |
| 7,908,631 B1* | 3/2011 | Zhang et al. | ............... | 725/105 |
| 7,962,513 B1* | 6/2011 | Boles | ............... | H04L 63/20 707/781 |
| 8,200,504 B2* | 6/2012 | Williams | ............... | G06Q 10/10 705/2 |
| 8,239,922 B2* | 8/2012 | Sullivan | ............... | F24F 11/0009 236/51 |
| 8,315,165 B2* | 11/2012 | Eydelman | ............... | H04L 41/069 370/230 |
| 8,458,363 B2* | 6/2013 | Rosenblatt et al. | ............... | 709/248 |
| 8,504,008 B1* | 8/2013 | Gossweiler et al. | ............... | 455/420 |
| 8,606,658 B2* | 12/2013 | Borom | ............... | G06Q 10/087 705/28 |
| 8,786,410 B2* | 7/2014 | Beals et al. | ............... | 340/12.1 |
| 8,806,331 B2* | 8/2014 | Grosz | ............... | G06F 17/3028 715/243 |
| 8,832,090 B2* | 9/2014 | Sugaya | ............... | H04L 12/2809 707/723 |
| 8,897,897 B2* | 11/2014 | Demskie | ............... | H04N 5/4403 340/12.28 |
| 8,958,788 B2* | 2/2015 | Sakamoto | ............... | H04L 12/2809 455/418 |
| 8,984,141 B2* | 3/2015 | Ishida | ............... | H04L 12/4633 709/203 |
| 9,437,102 B2* | 9/2016 | Arling | ............... | G08C 19/28 |
| 2002/0180579 A1* | 12/2002 | Nagaoka | ............... | H04L 12/2803 340/3.1 |
| 2003/0037104 A1* | 2/2003 | Okamura | ............... | 709/203 |
| 2003/0109270 A1* | 6/2003 | Shorty | ............... | 455/517 |
| 2004/0024912 A1* | 2/2004 | Fukao et al. | ............... | 709/249 |
| 2004/0103184 A1* | 5/2004 | Humpleman et al. | ........ | 709/223 |
| 2005/0075121 A1* | 4/2005 | Hasegawa | ............... | 455/518 |
| 2005/0216843 A1* | 9/2005 | Masters et al. | ............... | 715/740 |
| 2006/0064188 A1 | 3/2006 | Ushiku et al. | | |
| 2007/0061477 A1* | 3/2007 | Stoyanov et al. | ............ | 709/230 |
| 2007/0225866 A1* | 9/2007 | Moorer et al. | ............... | 700/276 |
| 2008/0005267 A1* | 1/2008 | Britt | ............... | 709/217 |
| 2008/0313299 A1* | 12/2008 | Ebbe et al. | ............... | 709/208 |
| 2009/0005045 A1 | 1/2009 | Kuriki et al. | | |
| 2009/0058681 A1* | 3/2009 | Johnston et al. | ............ | 340/947 |
| 2009/0195349 A1* | 8/2009 | Frader-Thompson et al. | | 340/3.1 |
| 2009/0319613 A1* | 12/2009 | Hjelm et al. | ............... | 709/204 |
| 2010/0013609 A1* | 1/2010 | Symoen et al. | ......... | 340/310.11 |
| 2010/0081375 A1* | 4/2010 | Rosenblatt et al. | ......... | 455/41.1 |
| 2010/0231432 A1* | 9/2010 | Shigei | ............... | 341/176 |
| 2010/0245118 A1* | 9/2010 | Lee et al. | ............... | 340/825.69 |
| 2010/0312881 A1* | 12/2010 | Davis et al. | ............... | 709/224 |
| 2010/0318911 A1 | 12/2010 | Holladay et al. | | |
| 2011/0302201 A1* | 12/2011 | Ogaz | ............... | G06Q 30/02 707/769 |
| 2013/0006400 A1* | 1/2013 | Caceres | ............... | H04L 12/2803 700/90 |
| 2013/0046843 A1* | 2/2013 | Sagara | ............... | 709/208 |
| 2013/0060830 A1* | 3/2013 | Sato et al. | ............... | 709/201 |
| 2013/0106738 A1* | 5/2013 | Kim et al. | ............... | 345/173 |
| 2013/0309971 A1* | 11/2013 | Kiukkonen et al. | ......... | 455/41.2 |

FOREIGN PATENT DOCUMENTS

| | | |
|---|---|---|
| JP | 2007-237300 | 9/2007 |
| JP | 2007237300 A * | 9/2007 |
| KR | 1020110069446 | 6/2011 |
| WO | WO 2009/086599 | 7/2009 |

OTHER PUBLICATIONS

European Search Report dated Aug. 21, 2015 issued in counterpart application No. 12836057.5-1853, 5 pages.
European Search Report dated Dec. 16, 2015 issued in counterpart application No. 12836057.5-1853, 12 pages.

* cited by examiner

GROUP WISE DEVICE MANAGEMENT SYSTEM AND METHOD

PRIORITY

This application claims priority under 35 U.S.C. § 119(a) to a Korean patent application filed on Sep. 30, 2011 in the Korean Intellectual Property Office and assigned Serial No. 10-2011-0100203, the entire disclosure of which is incorporated herein by reference.

BACKGROUND OF THE INVENTION

1. Field of the Invention

The present invention relates generally to an electronic device management system and method, and more particularly, to a group-wise device management system and method for integrally controlling a plurality of interoperable electronic devices as a group.

2. Description of the Related Art

Diversified electronic devices include, for example, home electronic appliances, office machines, medical appliances, and industrial machines. Specifically, electronic devices include, for example, a Television (TV), a refrigerator, a laundry machine, a computer, an electric fan, an air conditioner, a Digital Versatile Disc (DVD) player, an external speaker, a game console, a light controller, and others.

An electronic device management system has been provided for interconnecting the electronic devices placed in a predetermined area (e.g., a home, an office, or a hospital) into a network (e.g., a home network) by means of an intermediate device, such as Gateway (GW) with an Internet Protocol (IP). The electronic devices are controlled using an external device (e.g., a remote controller) connected to the intermediate device through a wired/wireless link.

In order to control the various types of electronic devices constituting a network, the external device is provided with device-specific control functions. More specifically, the conventional device management system operating with a network, which interconnects the electronic devices via a gateway, allows the devices to be controlled individually. Accordingly, even when it is necessary to control multiple electronic devices simultaneously, the user has to issue repeated control commands to the number of electronic devices. In the conventional system, when it is necessary to use a TV, a DVD player, and an external speaker system for watching a movie, the user has to power on the TV, DVD player, and external speaker system one at a time, by pushing the power buttons of the respective devices or those provided on a remote controller. Thus, the user has to repeat the same control action three times to power-on the tree electronic devices. The inconvenience of such a control mechanism increases as the distances between the devices increase.

As described above, the conventional device management system supports a per-device control, such that the user has to make the same control action repeatedly to control the interoperating electronic devices. Also, it is difficult for the user to be aware of the interoperability among the electronic devices using the conventional device management system.

SUMMARY OF THE INVENTION

The present invention has been made to address at least the above problems and/or disadvantages and to provide at least the advantages described below. Accordingly, an aspect of the present invention provides a device management system and method that is capable of grouping the interoperating electronic devices and controlling the devices per group.

Another aspect of the present invention provides a device management system and method that is capable of grouping a plurality of interoperating electronic devices and controlling the group in a batch control mode.

An additional aspect of the present invention provides a device management system and method that is capable of simultaneously controlling a plurality of interoperating electronic devices as a group by issuing a batch control command.

A further aspect of the present invention provides a device management system and method that is capable of simultaneously controlling a group of interoperating electronic devices with a portable terminal, which issues a batch control command for controlling the devices at a time.

Another aspect of the present invention provides a device management system and method that is capable of providing the user with information on the group of interoperating electronic devices and simultaneously controlling the group of electronic devices based on the electronic device group information. The system includes the electronic devices, a device management apparatus, a portable terminal, and a cloud server.

In accordance with an aspect of the present invention, a method for group-controlling devices is provided. Group information on interoperable devices among a plurality of electronic devices is acquired. The interoperable devices indicated in the group information are controlled as a group.

In accordance with another aspect of the present invention, a method is provided for group-controlling devices. A portable terminal transmits a control event including group information for controlling the devices as a group, to a device management apparatus. The device management apparatus identifies the devices indicated in the group information. The device management apparatus controls the devices as a group.

In accordance with a further aspect of the present invention, a method for group-controlling devices is provided. A control event for controlling a specific device is transmitted from a portable terminal to a device management apparatus. The device management apparatus determines devices that are interoperable with the specific device based on group information, upon receipt of the control event. The device management apparatus controls the interoperable devices and the specific device as a group.

In accordance with another aspect of the present invention, a method for group-controlling devices is provided. A device management apparatus receives an interrupt from a specific device among a plurality of devices connected to the device management apparatus. The specific device that generated the interrupt is identified. At least one other device interoperable with the specific device is determined. The specific device and the at least one other interoperable device are controlled as a group.

In accordance with another aspect of the present invention, a method is provided for group-controlling devices. A control event is detected for controlling at least one device. A type of the control event is determined. Devices, indicated by group information included in the control event, are controlled as a group, when the control event is a group control event. A specific device or a group of devices including the specific device are controlled according to a configuration state of a group control mode, when the control event is a device control event.

In accordance with another aspect of the present invention, a system is provided for group-controlling devices. The system includes a plurality of electronic devices. The system also includes a device management apparatus that acquires group information in response to a control event triggered for at least one of the plurality of electronic devices, and that controls a group of devices, from the plurality of electronic devices, as a group based on the group information.

In accordance with another aspect of the present invention, an apparatus is provided for group-controlling devices. The apparatus includes a first communication unit that supports communication with a plurality of devices. The apparatus also includes a second communication unit that supports communication with a portable terminal. The apparatus further includes a control unit that integrally controls the devices as a group based on group information, when a control event for controlling at least one of the devices is received. In accordance with another aspect of the present invention, an article of manufacture is provided for group-controlling devices. The article of manufacture includes a machine readable medium containing one or more programs which when executed implement the steps of: acquiring group information on interoperable devices from among a plurality of electronic devices; and controlling the interoperable devices indicated in the group information as a group.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
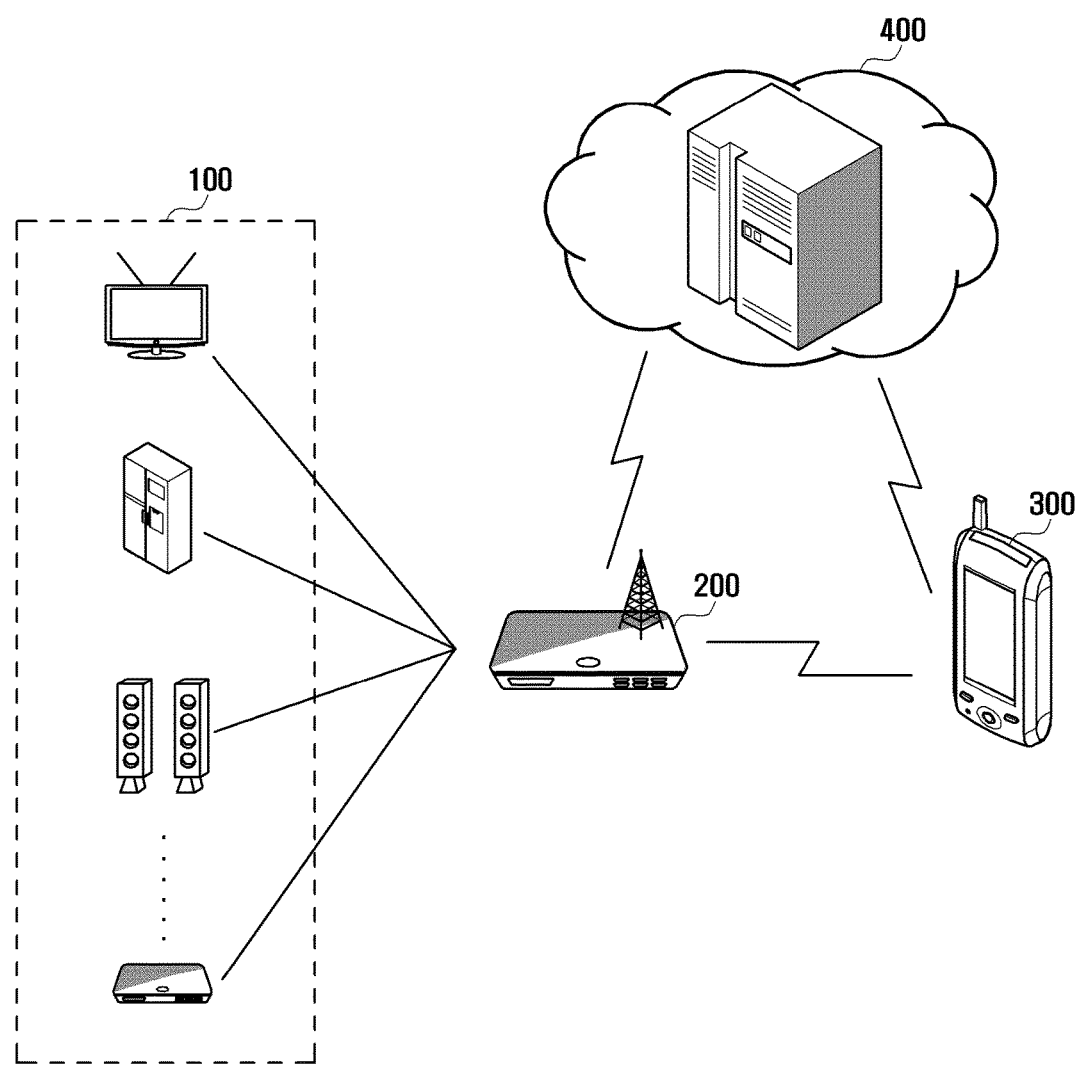
FIG. 1 is a schematic diagram illustrating a device management system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide an electronic device management system and method for controlling a group of electronic devices interoperating on a network (e.g., a home network or an office network) in a batch control mode.

According to an embodiment of the present invention, in a network environment where diverse electronic devices are connected to a device management apparatus through a network IP, a group of interoperating electronic devices is integrally controlled. The network environment can be a home network, an office network, a hospital network, or a factory network, composed of a plurality of electronic devices placed within a specific area.

According to an embodiment of the present invention, the system includes a plurality of electronic devices, a device management apparatus, a portable terminal, and a cloud server. One of the electronic devices, the device management apparatus, the portable terminal, and the cloud server acquires information on the group of interoperable electronic devices and simultaneously controls the group of the electronic devices based on the group information. According to an embodiment of the present invention, one of the electronic devices, the device management apparatus, the portable terminal, and the cloud server determines the interoperability among the electronic device based on the device information and configures the interoperable devices into a group.

According to an embodiment of the present invention, a device may acquire the group information from a cloud server, create the group information by referencing device information of the devices in the group, or use previously stored group information.

According to an embodiment of the present invention, the portable terminal may forward the group information acquired for controlling the electronic devices to the device management apparatus. If the group information is received, the device management apparatus identifies the electronic devices indicated by the group information and sends the control signal to at least one electronic device for group control. The device management apparatus can control the electronic devices based on the group information provided by the mobile terminal.

According to an embodiment of the present invention, the device management apparatus may acquire the group information for controlling the group of electronic devices from the cloud server as well as the portable terminal, or the device management apparatus may generate the group information by itself. The device management apparatus may identify the electronic devices by referencing the acquired group information and transmit a control signal to one of the identified electronic devices to control the group of the electronic devices. The device management apparatus may simultaneously control the electronic devices belonging to a group, based on the acquired group information.

According to an embodiment of the present invention, the electronic device configures a group with neighboring interoperable electronic devices by referencing the device information of other electronic devices, and generates the group information by itself. The electronic devices connect to at least one of the portable terminal and cloud server to acquire the group information on the interoperable electronic devices. The electronic device identifies other electronic devices by referencing the group information and sends a group control signal to at least one of the identified electronic devices to control the electronic devices in the group. Each electronic device may generate the group information by itself and control the electronic devices belonging to the group based on the group information. In embodiment of the present invention relating to device-centric group control, the electronic device may include the portable terminal.

A description is made of the device management system and a method with reference to accompanying drawings. However, the present invention is not limited to the device management system and apparatus described herein, and can be implemented in various embodiments.

FIG. 1 is a schematic diagram illustrating a device management system, according to an embodiment of the present invention.

As shown in FIG. 1, the device management system, according to an embodiment of the present invention, includes a plurality of electronic devices 100, a device management apparatus 200, a portable terminal 300, and a cloud server 400.

The device management system organizes the adjacent interoperable electronic devices into a group and supports batch control of the electronic devices in the group. Particularly, in an embodiment of the present invention, the diverse electronic devices 100 are connected to the device management apparatus 200. The device management apparatus 200 controls a specific electronic device and at least one other electronic device interoperable with the specific electronic device, as a group, based on group information acquired internally or externally, when the user generates a control event for the specific electronic device by means of the portable terminal 300. According to an embodiment of the present invention, the diverse electronic devices 100 are connected to the device management apparatus 200, which controls a plurality of electronic devices as a group, based on the group information provided by the portable terminal 300, when the user generates a group control event for the electronic devices by means of the portable terminal 300. Specifically, the electronic device management system, which includes the electronic devices 100, the device management apparatus 200, the portable terminal 300, and the cloud server 400, provides the group information on the group of interoperable electronic devices and supports the service for controlling the interoperating electronic devices as a group, based on the group information.

The electronic devices 100 include home electronic appliances, office machines, medical appliances, and industrial machines. For example, the electronic devices may include a TV, a refrigerator, a laundry machine, a computer (e.g., laptop computer or desktop computer), an electric fan, an air conditioner, a DVD player, an audio player, an external speaker system, a game console, a boiler, a light controller, a microwave oven, a gas oven, Digital Signage (DS), a Large Format Display (LFD), a digital camera, a cleaner, a boiler controller, a security device (e.g., Closed-Circuit Television (CCTV)), a light controller, a projector, and others. The electronic devices 100 may be located within a predetermined sector such as a home, an office, a hospital, and a factory, according to device properties. The electronic devices 100 connect to the device management apparatus 200 through wired or wireless interfaces. Particularly, in an embodiment of the present invention, the electronic devices 100 may connect to the device management apparatus 200 through an IP-based wired interface. The electronic devices 100 send device information in response to a request of the device management apparatus 200 and take an action under the control of the device management apparatus 200.

The device management apparatus 200 collects device information from the interconnected electronic devices 100. The device management apparatus 200 manages the collected device information and provide the collected device information to the portable terminal 300 and/or the cloud server 400. The device management apparatus 200 may store and manage the aggregation information in an internal storage. The device management apparatus 200 performs the device information collection process for the electronic devices 100 to update the previously stored information with the new aggregation information when any change is detected in the connected electronic devices 100 (e.g., a connection release of an electronic device or a connection of a new electronic device).

The device management apparatus 200 processes the individual control or batch control of the electronic devices 100, according to the control event. Particularly, in an embodiment of the present invention, the device management apparatus 200 may control a group of electronic devices indicated by the group information, acquired internally or externally among the electronic devices 100. For example, the device management apparatus 200 may perform group control according to a given environment in accordance with a group control process for the electronic devices based on the group information provided by the portable terminal 300, a group control process for the electronic devices based on the group information stored in the storage of the device management apparatus 200, a group control process for the electronic devices based on the group information generated by referencing the device information of the electronic devices 100 in real time, and a group control process for the electronic devices based on the group information acquired from the cloud server 400.

According to an embodiment of the present invention, the device management apparatus 200 and the cloud server 400 communicates through an IP-based wireless interface (e.g., a Wi-Fi communication standard interface). According to an embodiment of the present invention, the device management apparatus 200 requests device information from the connected individual electronic devices 100 and collects the device information sent by the individual electronic devices 100. The device management apparatus 200 provides the aggregation information to the portable terminal 300 and/or the cloud server 400. A more detailed description of the operation of the device management apparatus 200 and control method is provided below with reference to accompanying drawings.

The portable terminal 300 communicates with the electronic devices 100 through a wireless interface to control the devices individually. The portable terminal 300 may support individual control and group control of the electronic devices by communicating with the device management apparatus 200 through the wireless interface. The wireless interface for communication between the portable terminal 300 and the electronic devices 100 or the device management apparatus 200 may be implemented according to one of the following short range wireless communication standards: Radio Frequency Identification (RFID), Bluetooth, Near Field Communication (NFC), Infrared Data Association (IrDA), and Zigbee. The portable terminal 300 may send the aggregation information provided by the device management apparatus 200 to the cloud server 400, and acquires the group information generated based on the aggregation information from the cloud server 400. According to an embodiment of the present invention, the portable terminal 300 and the cloud server 400 may communicate with each other through an IP-based wireless interface. The portable terminal 300 may provide a user interface for supporting a group control function for controlling the electronic devices 100 in group. The user interface of the portable terminal 300 is described in greater detail below. A description is made of the control operation of the portable terminal with reference to accompanying drawings.

The portable terminal 300, for use in the device management system, according to an embodiment of the present invention, may be embodied as, for example, an information communication device, a multimedia device, and their equivalents, which are interoperable with the device management apparatus 200 for controlling the electronic devices 100. For example, the portable terminal 300 may be embodied as, for example, a mobile communication terminal operating in accordance with corresponding communication protocols, a Personal Computer (PC), a smartphone, a Portable Multimedia Player (PMP), a media player, a portable game console, a laptop computer, and a Personal Digital Assistant (PDA).

The cloud server 400 may communicate with the portable terminal 300, the device management apparatus 200, and device manufacturers' servers. The cloud server 400 may store and manage the interoperability information about the interoperable electronic devices. If a request for the group information is received from the portable terminal 300 or the device management apparatus 200, the cloud server 400 may configure a group of the interoperable electronic devices by referencing the interoperability information, and generate the group information on the configured group. The cloud server 400 may transmit the group information to the portable terminal 300 or the device management apparatus 200, which has requested the group information. The cloud server 400 may communicate with the device manufacturer's server to acquire the additional information on the electronic devices and update the interoperability information with the acquired additional information.

As described above, the device management system, according to an embodiment of the present invention, configures the electronic devices interoperating within a predetermined area into a group, and provides the group control service for integrally controlling the electronic devices belonging to the same group by means of the device management apparatus 200.

Figure 2:
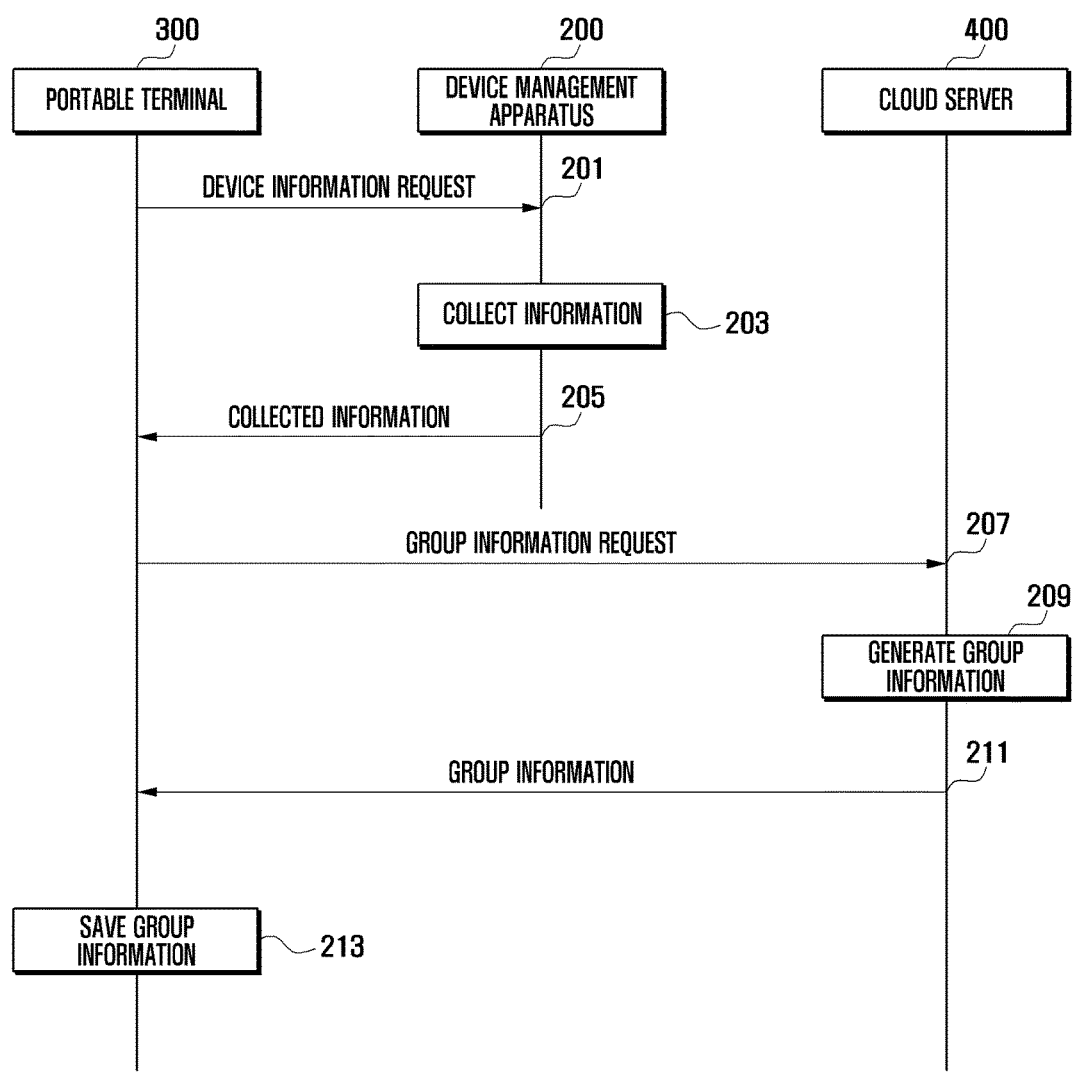
FIG. 2 is a signaling diagram illustrating a group information acquisition procedure in a device management system, according to an embodiment of the present invention.

FIG. 2 is a signaling diagram illustrating a group information acquisition procedure in a device management system, according to an embodiment of the present invention.

In FIG. 2, the portable terminal 300 collects the device information through the device management apparatus 200, requests the group information of the interoperable devices identified based on the aggregation information from the cloud server 400, and receives the group information generated and provided by the cloud server 400.

Referring to FIG. 2, the portable terminal requests the device information of the electronic devices 100 from the device management apparatus 200, in response to a user request, at step 201. For example, the user may input a control command through the user interface of the portable terminal 300 for acquiring device information of the electronic devices 100. The terminal 300 sends a device information request message to the device management apparatus 200, which manages the electronic devices 100.

If the device information request message is received, the device management apparatus 200 collects the information on the connected electronic devices 100, at step 203. For example, the device management apparatus 200 issues a command for collecting device information to the electronic devices connected to it via IP network, and receives the device information sent by the electronic devices.

The device management apparatus 200 generates the aggregation information based on the device information collected from the electronic devices 100, and sends the aggregation information to the portable terminal 300, at step 205. The device management apparatus 200 may store and manage the aggregation information in the internal storage. If the aggregation information request is received from the portable terminal 300 after storage, the device management apparatus 200 may provide the aggregation information stored in its internal storage without an information collection process. For example, if any change is detected from the connected electronic devices 100 connected (e.g., a connection release of a device or a connection establishment of a new device), the device management apparatus 200 performs the above described procedure to update the aggregation information.

If the aggregation information on the electronic devices 100 is received from the device management apparatus 200, the portable terminal 300 requests that the cloud server 400 transmit group information generated based on the aggregation information, at step 207. For example, if the aggregation information on the electronic devices 100 is received from the device management apparatus 200, the portable terminal 300 may send the cloud server 400 a message for grouping the interoperable electronic devices (e.g., group information request message) to the cloud server 400. The group information request message may include the aggregation information and request information for generating and transmitting the group information generated based on the aggregation information. According to an embodiment of the present invention, the request information may include an identifier indicating the type of the group information request message. The group information request message may include identity information for identifying the sender of the message (e.g., portable terminal 300 or device management apparatus 200), the form of which is described layer.

If the group information request message is received from the portable terminal 300, the cloud server 400 generates the group information based on the aggregation information included in the group information request message, at step 209. Specifically, the cloud server 400 may analyze the aggregation information to check the electronic devices indicated by the aggregation information, configure the electronic devices interoperable among each other into at least one group, and generate the group information on the at least one device group. According to an embodiment of the present invention, the cloud server 400 manages the interoperability of the electronic devices and interoperability information for grouping the devices in the form of a Data Base (DB), and determines grouping of the interoperable devices according to the interoperability among them by referencing the DB. For example, the cloud server 400 may retain the device information of device A, device B, device C, device D, and device E, and interoperability information thereof. The device information may be information in the form of a code identifying the electronic device. The interoperability information may be information indicating at least one interoperable electronic device.

For example, if device A is interoperable with device B and device E, device A may have information of interoperability with devices B and E. The cloud server 400 extracts the device information included in the aggregation information and derives the interoperability information of the electronic devices from the DB based on the device information. The cloud server 400 also may determine grouping of the interoperable devices based on the aggregation information by referencing the interoperability information, and may generate the group information of at least one device group.

Once the group information is generated, the cloud server 400 may send the generated group information to the portable terminal 300, at step 211.

If the group information is received from the cloud server 400, the portable terminal 300 stores the received group information in an internal storage, at step 213. Afterward, the group information may be provided to the portable terminal 300 in one of various forms through the Graphical User Interface (GUI) supported by the terminal 300, in response to the user request. The user may issue a group control command for integrally controlling the electronic devices using the group information provided through the GUI. The user interface, according to an embodiment of the present invention, is described in detail below.

Although not depicted in FIG. 2, the group information may be configured in the portable terminal 300 according to user manipulation. For example, the user may acquire device information on the electronic devices from the device management apparatus 200 and may generate the group information by referencing the device information.

Figure 3:
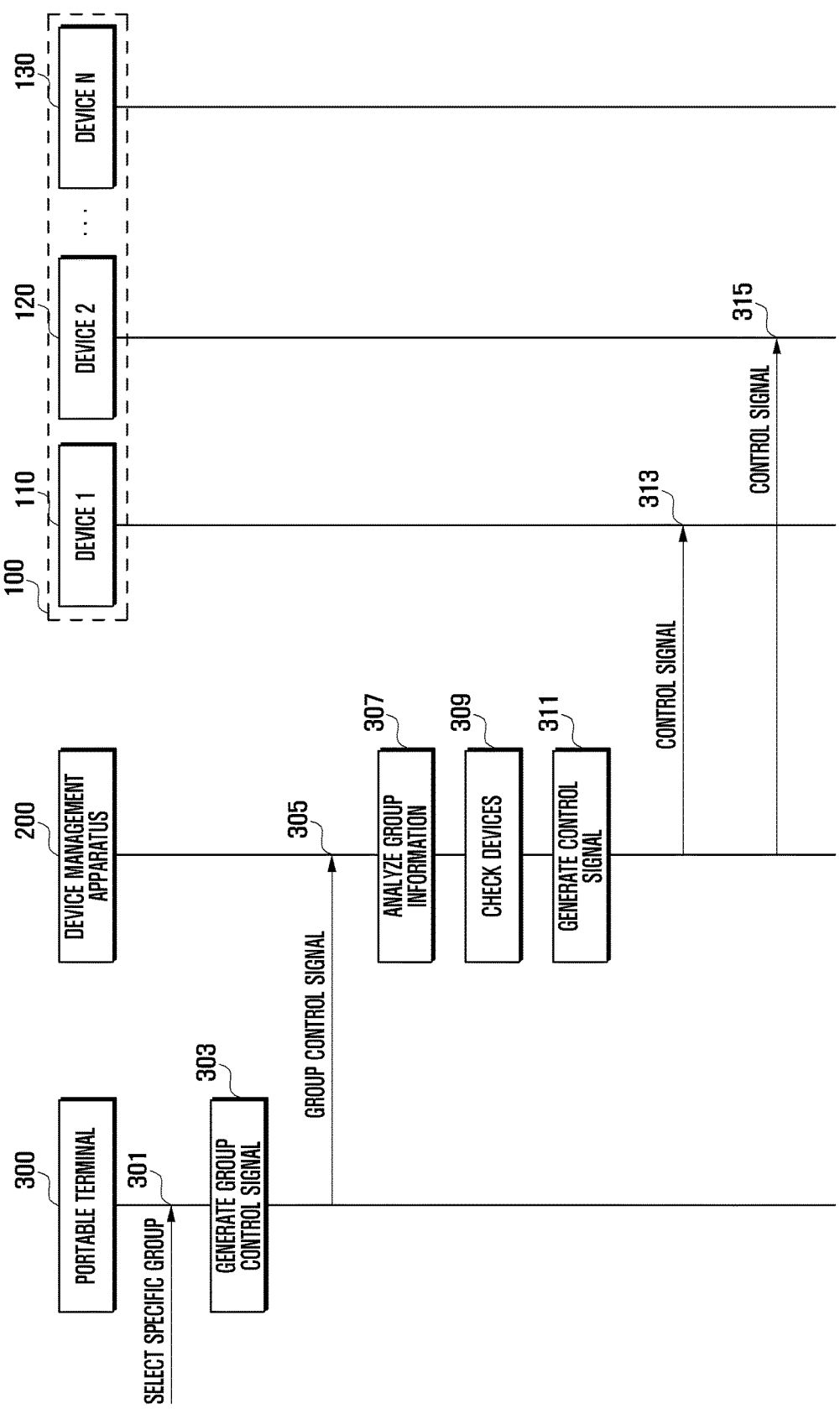
FIG. 3 is a signaling diagram illustrating a group-specific device management method, according to an embodiment of the present invention.

FIG. 3 is a signaling diagram illustrating a group-specific device management method, according to an embodiment of the present invention.

In FIG. 3, the portable terminal 300 sends the device management apparatus 200 the group information on a group of the electronic devices, such that the device management apparatus 200 identifies the electronic devices belonging to the device group and manages the identified electronic devices as a group.

Referring to FIG. 3, the user may generate group selection information for controlling a group of electronic devices through a user interface of the portable terminal 300, at step 301. The user interface and group selection operation using the user interface are described in detail below.

The portable terminal generates a group control signal to request control of the device group in response to the group selection input, at step 303, and sends the group control signal to the device management apparatus 200, at step 305. The group control signal may include an identifier, group information, and a control command. For example, the group control signal may include group information on the specific group selected by the user (i.e., a group of device information). The group control signal may include an identifier indicating that the signal is for group control of the electronic devices and a control command indicating a function to be executed. The control command may be a control value indicating a turn-on/off control, a volume control, a channel switching control, a running time control, a brightness control, or a security function enabling/disabling control, for simultaneously controlling a group of devices.

Upon receipt of the group control signal from the portable terminal 300, the device management apparatus 200 extracts the group information from the group control signal and analyzes the group information, at step 307. The device management apparatus 200 identifies the electronic devices to be group-controlled based on the group information, at step 309. According to an embodiment of the present invention, if a control signal is received from the portable terminal 300, the device management apparatus 200 checks a time indicator included in the control signal to determine whether the control signal is a group control signal. If it is determined that the group control signal is received, the device management apparatus 200 extracts the group information from the group control signal and identifies the electronic devices to be controlled as a group.

The device management apparatus 200 generates a control signal for group control of the identified electronic devices, at step 311. The device management apparatus 200 may generate control signals addressed to the respective electronic devices of the group and a signal addressed to at least one of the electronic devices of the group. Specifically, the control signal may be generated to the electronic devices to be co-controlled according to the group control.

The device management apparatus 200 sends the control signal to individual electronic devices identified by the group information, at steps 313 and 315. In FIG. 3, it is assume that, among N electronic devices (electronic device 1 110, electronic device 2 120, . . . , electronic device N 130) connected to the device management apparatus 200, the electronic device 1 110 and electronic device 2 120 are identified by the group information. The device management apparatus 200 may generate two control signals for controlling the electronic device 1 110 and the electronic device 2 120 as a group, and sends the control signals to the respective electronic devices 110 and 120, such that the electronic devices 110 and 120 execute the functions indicated by the control signals received from the device management apparatus 200.

Figure 4:
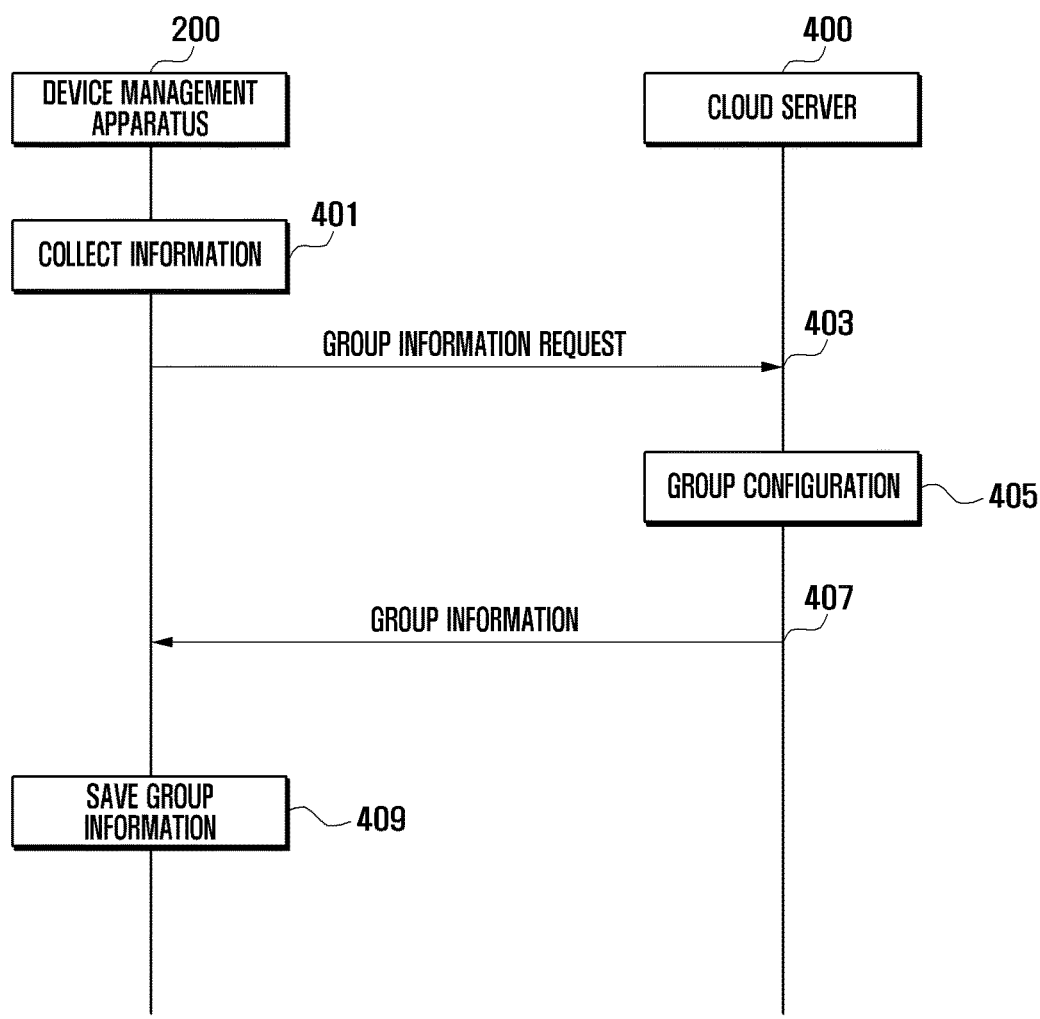
FIG. 4 is a signaling diagram illustrating a group information acquisition procedure of the group-specific device management method, according to an embodiment of the present invention.

FIG. 4 is a signaling diagram illustrating a group information acquisition procedure of the group-specific device management method, according to an embodiment of the present invention.

In FIG. 4, the device management apparatus 200 requests the group information on the electronic devices corresponding to the aggregation information from the cloud server 400, and the cloud server 400 generates the group information to the device management apparatus 200 in response to the request.

Referring to FIG. 4, the device management apparatus 200 collects the information on the electronic devices 100 connected to it, at step 401. For example, when an interrupt for triggering collected device information-based group information generation is received from the portable terminal 300, the device management apparatus 200 collects the information on the devices connected to the device management apparatus 200. If an interrupt (such as a connection release of an electronic device or a connection establishment of a new electronic device) is detected, the device management apparatus 200 collects the information on the electronic devices.

If the device information is collected, the device management apparatus 200 may generate the aggregation information based on the collected device information and request the group information generated based on the aggregation information from the cloud server 400, at step 403. For example, the device management apparatus 200 sends the cloud server 400 a message to request grouping of the interoperable electronic devices based on the aggregation information (e.g. group information request message). The group information request message may include the aggregation information and the request information for requesting issuance of the group information based on the aggregation information.

If the group information request is received from the device management apparatus 200, the cloud server 400 generates at least one group information based on the aggregation information received along with the group information request, at step 405. As described above, the cloud server 400 analyzes the aggregation information to identify the electronic devices indicated by the aggregation information, configures the interoperable electronic devices into a group, and generates at least one group information on the at least one group. As described above, the cloud server 400 may control the interoperability among the electronic devices and interoperability information for device grouping in the form of a database, and may determine interoperability of the electronic devices and device grouping by referencing the database.

Once the group information is generated, the cloud server 400 sends the group information to the device management apparatus 200, at step 407.

If the group information is received from the cloud server 400, the device management apparatus 200 stores the group information in the internal storage, at step 409. Afterward, the device management apparatus 200 detects a device control event triggered in the portable terminal 300 or generated by the user, and controls a group of the electronic devices based on the group information stored internally.

Although not depicted in FIG. 4, the device group information may be configured by the user by means of the portable terminal 300, and then provided to the device management apparatus 200, such that the device management apparatus 200 stores the group information received from the portable terminal in its internal storage.

Figure 5:
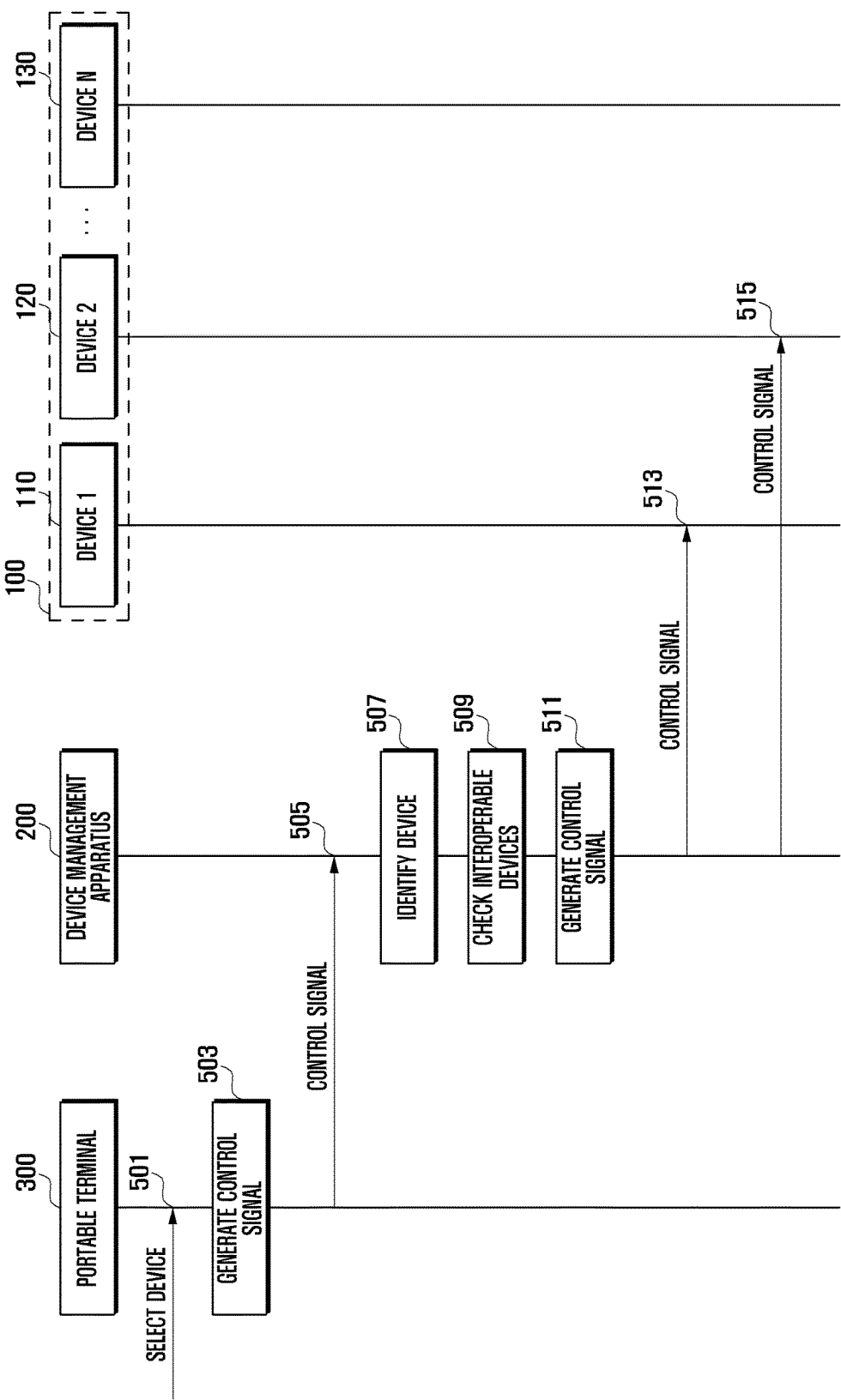
FIG. 5 is a signaling diagram illustrating a group-specific device management method, according to an embodiment of the present invention.

FIG. 5 is a signaling diagram illustrating a group-specific device management method, according to an embodiment of the present invention.

In FIG. 5, if a control event for controlling a specific electronic device is detected, the device management apparatus 200 identifies the electronic devices interoperable with the specific electronic device, based on the group information, and integrally controls the identified electronic devices as a group. Specifically, if a control command addressing a specific electronic device is received from the portable terminal 300, the device management apparatus 200 acquires the group information internally or externally, and integrally controls at least one electronic device interoperable with the specific electronic device as a group.

Referring to FIG. 5, the user generates selection information for controlling a specific electronic device through a user interface of the portable terminal 300, at step 501. In response to the user's selection input, the portable terminal 300 generates a control signal (i.e., an interrupt event) requesting control of the corresponding electronic device, at step 503, and sends the control signal to the device management apparatus 200, at step 505. The control signal may include an identifier, device information, and a control command. For example, the control signal may include the device information identifying a specific electronic device selected by the user. The control signal also may include the type identifier for indicating per-device control signal and the control command indicating the function to be executed at the electronic device.

If the control signal is received from the portable terminal 300, the device management apparatus 200 identifies the target device to be controlled by the received control signal, at step 507. According to an embodiment of the present invention, if the control signal is received from the portable terminal 300, the device management apparatus 200 checks the identifier included in the control signal to determine that the control signal is for controlling a specific electronic device. If it is determined that the device-specific control signal is received, the device management apparatus 200 extracts the device information from the control signal and identifies the electronic device based on the device information.

The device management apparatus 200 checks the electronic devices interoperable with the identified electronic device, at step 509. For example, if the device-specific control signal is received, the device management apparatus 200 may check whether the group control mode is activated. If it is determined that the group control mode is activated, the device management apparatus acquires group information, internally or externally, to check the electronic devices interoperable with the control target electronic device. The group information may be stored previously in the internal storage of the device management apparatus 200 or may be acquired from the cloud server 400 by sending a group information request. The group information acquisition procedure is described in detail below.

The device management apparatus 200 generates a control signal for controlling the interoperable electronic devices as a group, at step 511. The device management apparatus 200 may generate a plurality of signals addressed to the respective devices, or a signal addressed to one of the interoperable electronic devices. Specifically, the control signal may be generated to as many as the number of the electronic devices to be co-controlled according to the group control.

The device management apparatus 200 sends the control signal to the respective electronic devices identified by the group information, at steps 513 and 515. In FIG. 5, it is assumed that, among N electronic devices (the electronic device 1 110, the electronic device 2 120, . . . , and the electronic device N 130) connected to the device management apparatus 200, the electronic device 1 110 is the device identified by the device information of the control signal received from the portable terminal 300 and the electronic device 2 120 is the device identified by the device management apparatus 200 as interoperable with the electronic device 1 110. The device management apparatus 200 may generate two control signals for controlling the electronic device 1 110 and the electronic device 2 120 as a group, and sends the control signals to the respective electronic devices 110 and 120 such that the electronic devices 110 and 120 execute the functions indicated by the control signals received form the device management apparatus 200.

Although not depicted in FIG. 5, if the control signal addressed to a specific electronic device is received from the portable terminal 300, the device management apparatus 200 may request the group information on the electronic devices interoperable with the control target device from the cloud server 400. The device management apparatus 200 requests the cloud server 400 for the group information by providing the device information along with the aggregation information as a collection of the information on the devices connected to it. If the group information is received from the cloud server 400, the device management apparatus 200 may control the electronic devices identified by referencing the group information as a group.

If the control information addressed to a specific electronic device is received from the portable terminal 300, the device management apparatus 200 may generate the group information by checking the electronic devices interoperable with the control target device based on the aggregation information. The device management apparatus 200 may control the electronic devices as a group based on the generated group information.

If the control signal addressed to a specific electronic device is received from the portable terminal 300, the device management apparatus 200 may check the electronic devices interoperable with the control target electronic device based on the internal group information and control the electronic devices as a group based on the group information.

Although FIG. 5 is directed to an embodiment in which the control signal is generated for as many as the number of the electronic devices belonging to the group, the present invention is not limited thereto. For example, it is assumed that the control signals addressed to the entire electronic devices indicated by the group information are generated based on the initial group control for the electronic devices in FIG. 5 and the following description. However, if a control request for a specific electronic device is received while electronic devices are running in accordance to the group information, it is possible to control the control-requested device. Also, it is possible to generate the control signal addressed to some electronic devices according to the group information indicating specific electronic devices not entire electronic devices. Specifically, according to an embodiment of the present invention, it is not necessary for the control signal generated by an interrupt detected in managing a group of electronic devices to be addressed to all of the electronic devices, but one or more devices according to the control type of the interrupt. For example, if the user generates a control request for volume control of the TV while the TV, DVD player, and external speaker system are interoperating among each other, the device management apparatus 200 may generate only one control signal for the volume control of the TV.

Figure 6:
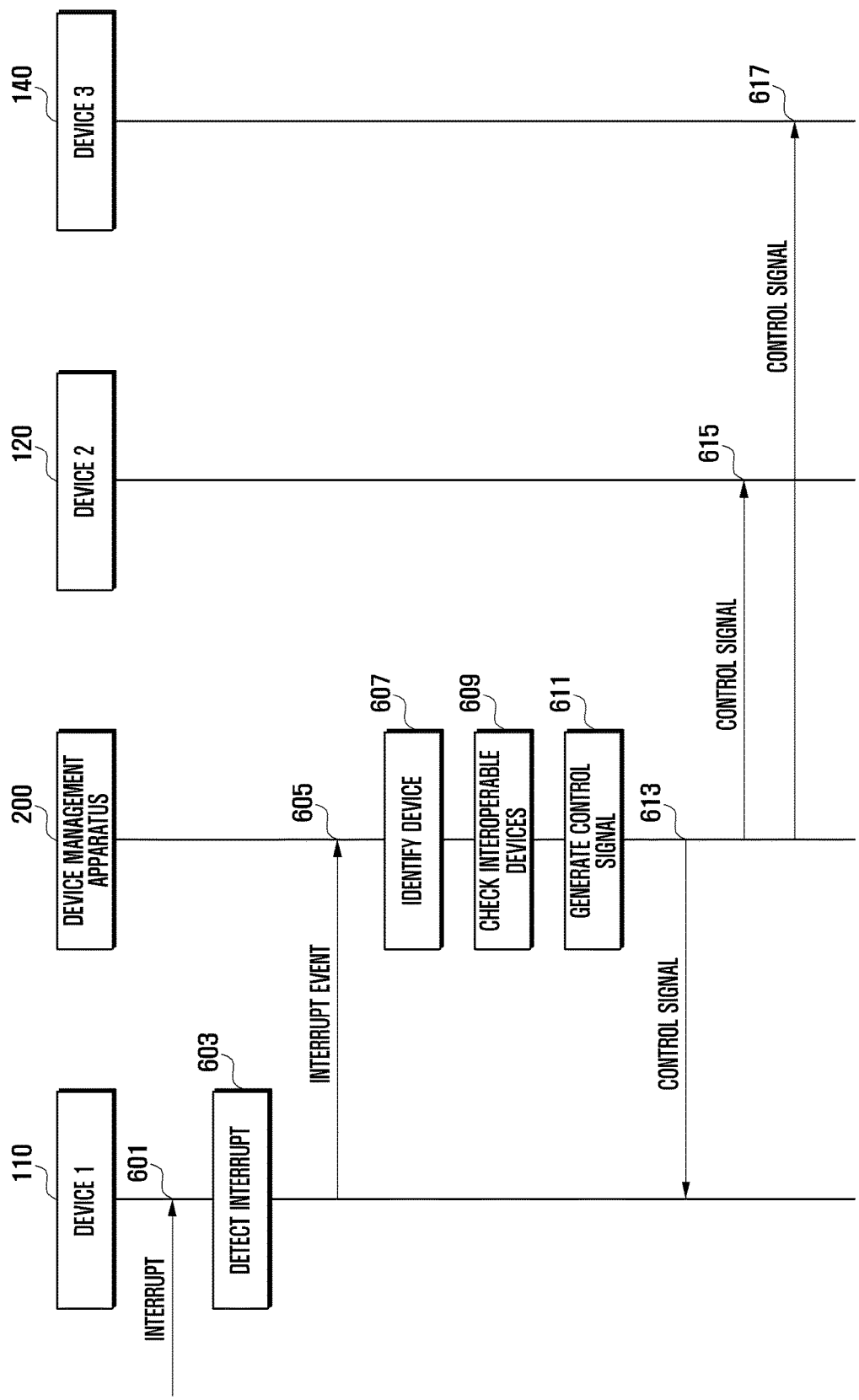
FIG. 6 is a signaling diagram illustrating a group-specific device management method, according to an embodiment of the present invention.

FIG. 6 is a signaling diagram illustrating a group-specific device management method, according to an embodiment of the present invention.

In FIG. 6, if the user controls a specific device directly so as to trigger an interrupt, the device management apparatus 200 acquires the group information on the electronic devices interoperable with the specific device in response to the interrupt, and integrally controls the specific electronic device and the electronic devices interoperable with the specific device as a group.

Referring to FIG. 6, the user inputs an instruction to control the electronic device 1 110 directly so as to trigger an interrupt, at step 601. The electronic device 1 110 detects the interrupt, at step 603, and sends an interrupt event to the device management apparatus 200, at step 605. Here, the interrupt event may include the device information indicating the electronic device 1 110 and a control command corresponding to the interrupt (e.g., information on the function to be executed in response to the interrupt).

If the interrupt event is received from the electronic device 1 110, the device management apparatus 200 identifies the electronic device that has sent the interrupt event (i.e., electronic device 1 110), at step 607. According to an embodiment of the present invention, the device management apparatus 200 identifies the electronic device 1 110 by referencing the device information included in the interrupt event.

The device management apparatus 200 may check the electronic devices interoperable with the identified electronic device 1 110, at step 609. For example, if the interrupt event is received from the electronic device 1 110, the device management apparatus 200 checks whether the group control mode is activated. If it is determined that the group control mode is activated, the device management apparatus 200 acquires the group information for the electronic devices interoperable with the electronic device 1 110, internally or externally, and determines the electronic devices interoperable with the electronic device 1 110 based on the group information. As described above, the group information may be stored in the internal storage of the device management apparatus 200, or received from the cloud server 400 by transmitting the group information request.

The device management apparatus 200 generates a control signal for group control of the electronic devices, at step 611. The device management apparatus 200 may generate the individual control signals for controlling the electronic devices belonging to the group or a signal for controlling at least one of the electronic devices belong to the group. Specifically, the control signal may be generated for as many as the number of the electronic devices to be co-controlled according to the group control.

The device management apparatus 200 sends the control signal to the respective electronic devices identified by the group information, at steps 613, 615, and 617. In FIG. 6, it is assumed that, among the N electronic devices (the electronic device 1 110, the electronic device 2 120, an electronic device 3 (140), . . . , and the electronic device N 130) connected to the device management apparatus 200, the electronic device 1 110, the electronic device 2 120, and the electronic device 3 140 belonged to the same group. In FIG. 6, the electronic device 1 110 is the device corresponding to the interrupt event, and the electronic device 2 120 and electronic device 3 140 are the devices interoperable with the electronic device 1 110. Accordingly, if the interrupt event is received from the electronic device 1 110, the device management apparatus 200 may generate three control signals for controlling the electronic device 2 120 and electronic device 3 140, along with the electronic device 1 110, and send the control signals to the electronic device 1 110, the electronic device 2 120, and the electronic device 3 140, respectively. The electronic device 1 110, the electronic device 2 120, and the electronic device 3 140 perform specific functions according to the corresponding control signals.

Figure 7:
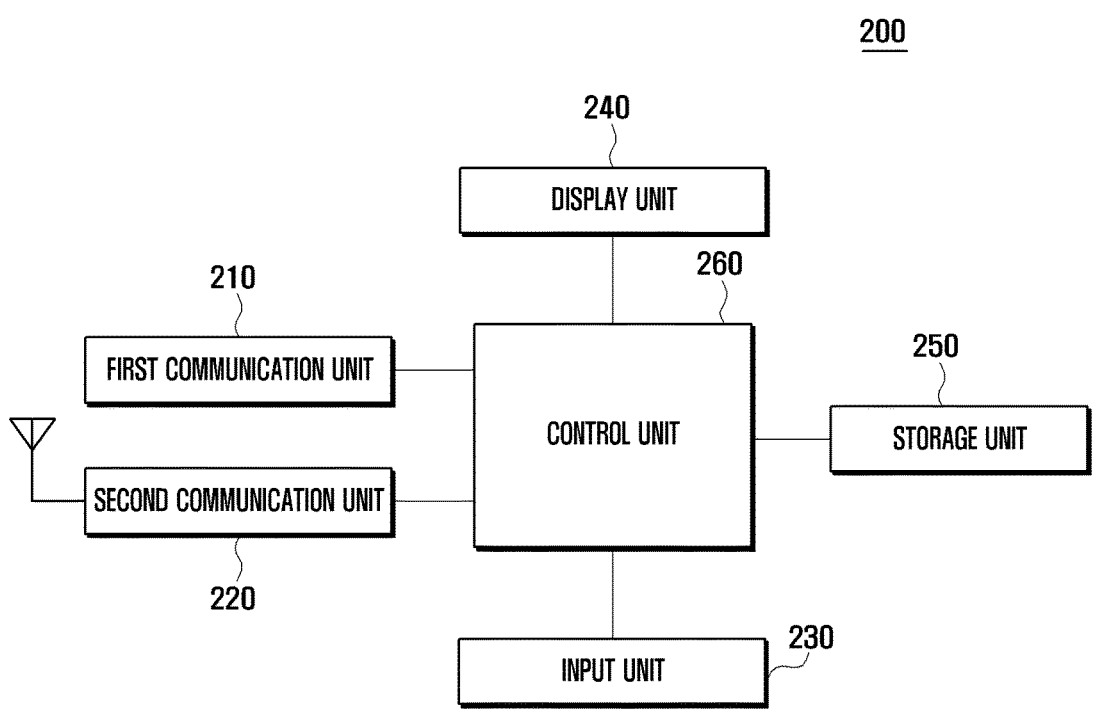
FIG. 7 is a block diagram illustrating a configuration of the device management apparatus, according to an embodiment of the present invention.

FIG. 7 is a block diagram illustrating a configuration of the device management apparatus, according to an embodiment of the present invention.

As shown in FIG. 7, the device management apparatus 200, according to an embodiment of the present invention, includes a first communication unit 210, a second communication unit 220, an input unit 230, a display unit 240, a storage unit 250, and a control unit 260. The device management apparatus 200 may further include an audio processing unit having a microphone and a speaker, and battery for supplying power to the function blocks.

The first communication unit 210 supports an IP-based wired interface connection of the electronic devices 100 and communication with the electronic devices 100 connected through the wired interface. For example, the first communication unit 210 may send the connected electronic devices 100 a command for collecting information and may forward the device information received from the respective electronic devices 100 to the control unit 260. The first communication unit 210 may also send one of a device-specific and a group-specific control signal to the electronic device. When the wireless interface is supported between the electronic devices 100 and the device management apparatus 200, the first communication unit 210 may omitted, and the second communication unit 220 is responsible for the communication functions described above.

The second communication unit 220 supports a wireless interface connection for communication with the portable terminal 300. For example, the second communication unit 220 may receive the device-specific or group-specific control signal transmitted by the portable terminal 300, and may forward the control signal to the control unit 260. The second communication unit 220 also delivers the aggregation information request signal transmitted by the portable terminal 300 to the control unit 260. The second communication unit 220 may send the aggregation information generated with the collected device information and the other signals (e.g., a feedback signal corresponding to a result of an execution made in response to the user request) to the portable terminal 330 under the control of the control unit 260. According to an embodiment of the present invention, the second communication unit 220 may include at least one of a Bluetooth module, an IrDA module, an RFID module, and an NFC module for supporting short range wireless communication.

The device management apparatus 200 may include a wireless communication unit for supporting an IP-based Internet access service. The device management apparatus 200 may include a communication unit to access the cloud server 400 for IP-based data exchange. Specifically, the device management apparatus 200 may include various communication modules for supporting communication with the electronic devices 100, the portable terminal 300, and the cloud server 400, as well as the first and second communication units 210 and 220 without restriction.

The input unit 230 is implemented to receive various inputs related to the operations of the device management apparatus 200. The input unit 230 may include various input means such as a keyboard, a keypad, key buttons, and a mouse compatible with the device management apparatus 200. When the display unit 240 is implemented with a touchscreen, the input unit 230 may include a touch map provided on the touchscreen. The input unit 230 may generate input signals for supplying power to the device management apparatus 200, for activating/deactivating a group control mode, for selecting one or more electronic devices, and for controlling the selected electronic devices in response to the user input. The input signal generated by the input unit 230 is delivered to the control unit 260, such that the control unit 260 issues a command corresponding to the input signal.

The display unit 240 is responsible for displaying screens related to the operations of the device management apparatus 200. For example, the display unit 240 may display a list of the electronic devices 100 connected to the device management apparatus 200. The display unit 240 may display the activated electronic devices and deactivated electronic devices in a distinguishable manner. The display unit 240 may also display a screen for the user to select at least one of the electronic devices, a screen for presenting information on the groups of the electronic devices managed by the device management apparatus 200, and a screen for receiving input of selection for device group configuration. According to an embodiment of the present invention, the display unit may be implemented with one of a Liquid Crystal Display (LCD), a Light Emitting Diode (LED), an Organic LED (OLED), and an Active Matrix OLED (AMOLED). According to an embodiment of the present invention, the display unit 240 is equipped with a touchscreen so as to receive touch-based user input and generate an input signal to the control unit 260.

The storage unit 250 may store various applications and data related to the operations of the device management apparatus 200, and includes at least one memory. According to an embodiment of the present invention, the storage unit 250 may be implemented with at least one of a Read Only Memory (ROM), a flash memory, a Random Access Memory (RAM), an internal Hard Disk, an external Hard Disk, and other storage media. The storage unit 250 may store, persistently or temporarily, the operating system of the device management apparatus 200, programs and data related to device information collection and management, programs and data related to control of the operation of the electronic devices 100, programs and data related to group configuration of the electronic devices 100 and group information generation, and programs and data related to the group control of the electronic device according to the group information. The storage unit 250 may store diverse information related to the operation of the group control mode (e.g., device information, aggregation information, group information, interoperability information, and configuration information).

The control unit 260 controls overall operations of the device management apparatus 200. Particularly, in an embodiment of the present invention, the control unit 260 may integrally control a plurality of electronic devices per group based on the group information acquired in association with the electronic devices connected to the device management apparatus 200. For example, the control unit 260 collects device information from the connected electronic devices, manages the device information as aggregation information, and controls to transmit the aggregation information to the portable terminal 300 and/or the cloud server 400. The control unit 260 also may configure the interoperable electronic devices into a group based on the aggregation information, and may generate group information. The control unit 260 detects a control event triggered for controlling the electronic devices and performs device-specific control or device group-specific control depending on the type of the control event.

Particularly, the control unit 260 checks the electronic device to which the received control event is addressed and controls, if the control event is a group control event, the electronic devices as a group based on the group information carried in the group event. If the control event is a device control event, the control unit 260 may determine whether the group control mode is activated. If the group control mode is activated, the control unit 260 identifies the electronic devices to which the control event is addressed and acquires the group information associated with the identified electronic device, internally or externally, to control the electronic devices indicated by the group information as a group.

The control operations of the control unit 260 of the device management apparatus 200 become more clear in the description of the operations of the device management apparatus 200 and control method thereof, which is made with reference to accompanying drawings.

Figure 8:
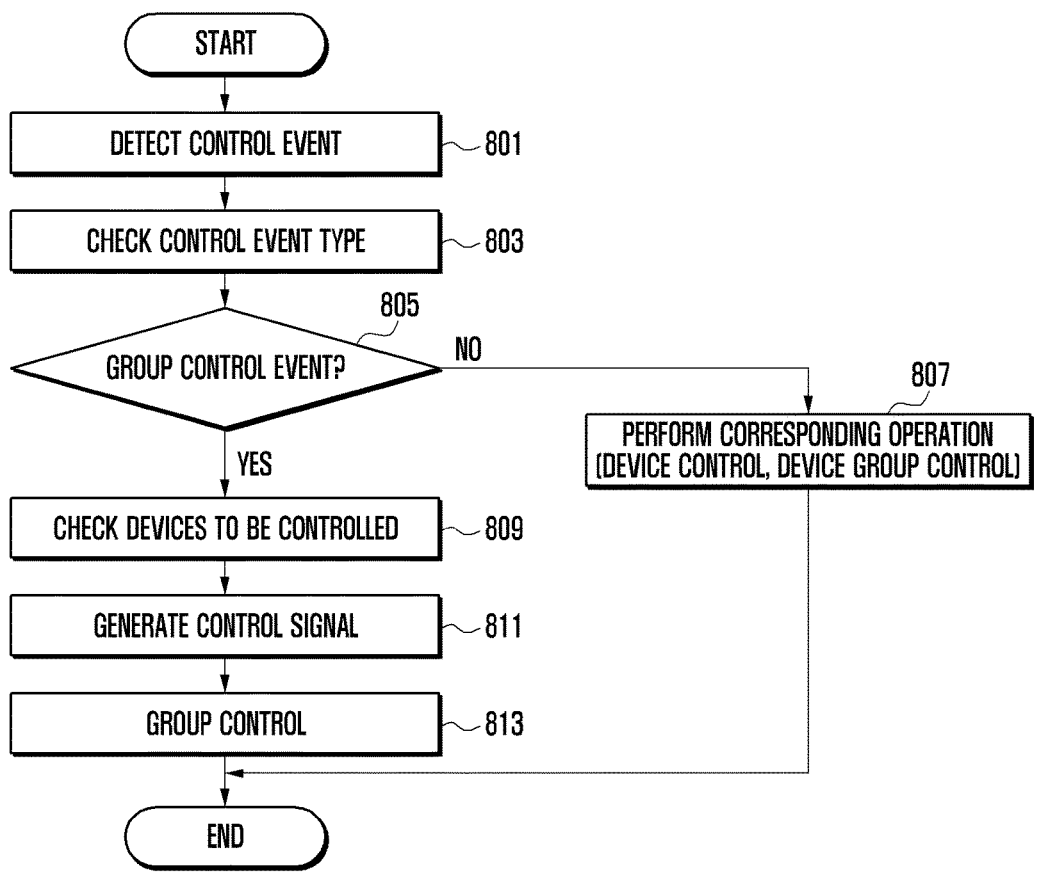
FIG. 8 is a flowchart illustrating a device management method, according to an embodiment of the present invention.

FIG. 8 is a flowchart illustrating a device management method, according to an embodiment of the present invention.

FIG. 8 is directed to an embodiment in which the device management apparatus 200 determines whether the control event received from the portable terminal 300 is a device-specific control event or a group-specific control event, and performs control of the electronic device according to the determination result.

Referring to FIG. 8, the device management apparatus 200 receives the control event from the portable terminal 300, at step 801. If the control event is received, the device management apparatus 200 checks the type of control event, at step 803, and determines whether the control event is a group control event, at step 805. The type of control event is determined by referencing the type indicator or depends on whether the control event includes the group information.

If it is determined that the control event is not a group control event, i.e. if the control event is a device control event, the device management apparatus performs the corresponding operation, at step 807. For example, the device management apparatus 200 checks whether the group control mode is activated and, if the group control mode is deactivated, controls the electronic device according to the control event. If the group control mode is activated, the device management apparatus 200 acquires group information on the electronic devices interoperable with the target electronic device and controls the electronic devices as a group based on the acquired group information. The group control operation is described in greater detail below with reference to FIG. 9.

If is determined that the control event is a group control event, the device management apparatus 200 checks the electronic devices to be group-controlled based on the group information carried in the control event, at step 809. The device management apparatus may generate a control signal for integrally controlling the checked electronic devices as a group, at step 811.

The device management apparatus 200 sends the control signal to the respective electronic devices indicated by the group information so as to integrally control the electronic devices as a group, at step 813.

Figure 9:
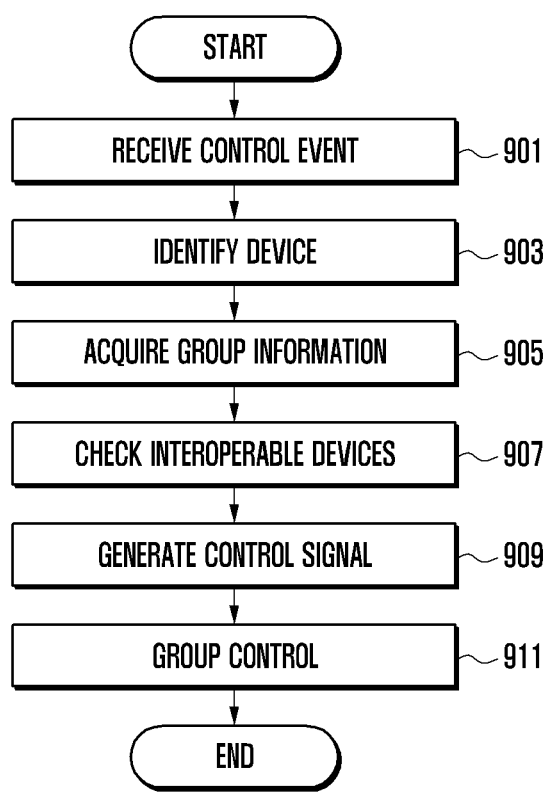
FIG. 9 is a flowchart illustrating a device management method, according to an embodiment of the present invention.

FIG. 9 is a flowchart illustrating a device management method, according to another embodiment of the present invention.

FIG. 9 is directed to an embodiment of the present invention in which a control event is received from the portable terminal 300 in state where the device management apparatus 200 is in a group control mode, such that the device management apparatus 200 integrally controls the specific electronic device and other devices interoperable with the specific electronic device as a group.

Referring to FIG. 9, the device management apparatus 200 receives a control event from the portable terminal 300, at step 901. In FIG. 9, it is assumed that the user selects a specific electronic device by means of the portable terminal 300, such that the control event is generated. The control event may include device information indicating the electronic device selected by the user, and an indicator indicating that the control event is a signal for controlling a specific electronic device.

If the control event is received, the device management apparatus identifies the electronic device as indicated by the control event at step 903. Specifically, if the control event is received from the portable terminal 300, the device management apparatus 200 may identify the electronic device as the target of the control event. According to an embodiment of the present invention, the device management apparatus 200 checks the identifier included in the control event to determine the type of control event and, if the control event is a device control event, identify the electronic device to be controlled based on the device information included in the control event.

The device management apparatus 200 acquires the group information in association with the identified electronic device, at step 905. The group information may be retrieved from the storage unit 250 of the device management apparatus 200, or may be received from the cloud server 400. The group information acquisition procedure is described in greater detail below.

The device management apparatus 200 checks the electronic devices interoperable with the identified electronic device by referencing the group information, at step 907. The device management apparatus 200 may generate a control signal for controlling the electronic devices as a group, at step 909. At this time, the device management apparatus 200 may generate the control signal for as many as the number of the electronic devices to be controlled as a group, according to the group information. The control signal is device-specific such that the controls signals addressed to the respective electronic devices differ from each other.

The device management apparatus 200 may control the electronic devices as a group by transmitting the control signal to the respective electronic devices identified by referencing the group information, at step 911. Specifically, the device management apparatus 200 sends the control signals to the electronic devices indicated by the group information to integrally control the target electronic device and other electronic devices interoperable with the target electronic device as a group.

Figure 10:
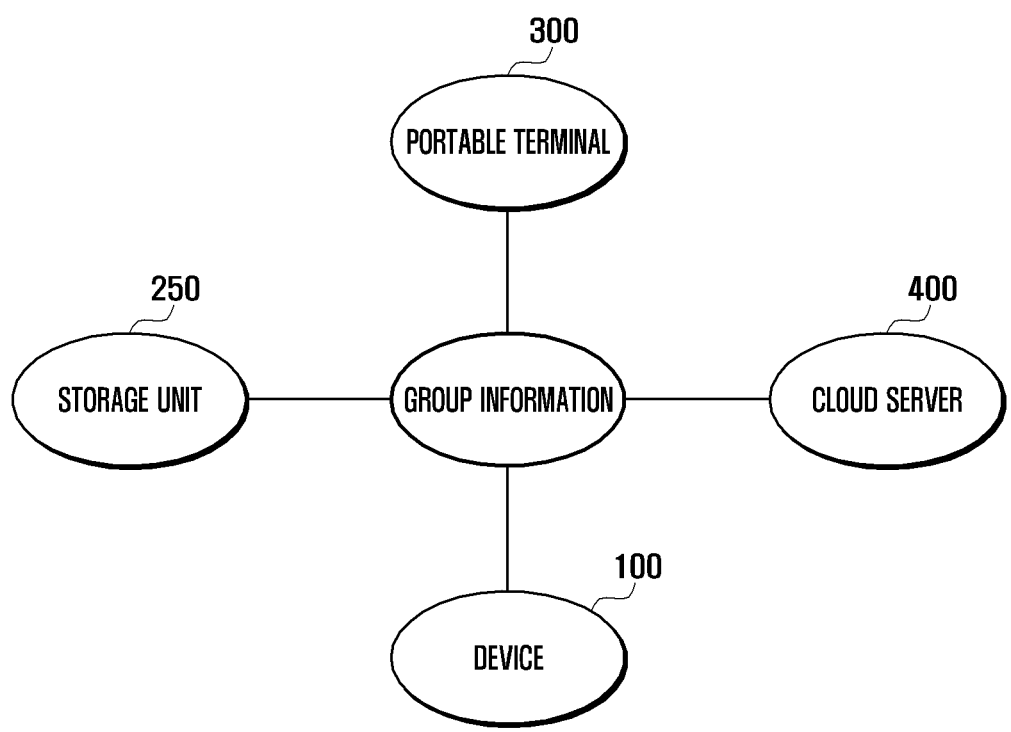
FIG. 10 is a diagram illustrating a principle of group information acquisition operation in the device management system, according to an embodiment of the present invention.

FIG. 10 is a diagram illustrating a principle of group information acquisition operation in the device management system, according to an embodiment of the present invention.

Referring to FIG. 10, the device management apparatus 200 may acquire the group information from the portable terminal 300, the storage unit 250 of the device management apparatus 200, the electronic devices 100, and the cloud server 400.

In detail, if the user selects the information on the group of electronic devices through the user interface of the portable terminal 300, the portable terminal 300 sends the selected group information to the device management apparatus 200. If the group information is received from the portable terminal 300, the device management apparatus 200 controls the group of the electronic devices based on the acquired group information.

The device management apparatus 200 may acquire the group information configured by the user through the portable terminal 300 or provided by the cloud server 400, and store the acquired group information in its storage unit 250. Afterward, if a request for controlling a specific electronic device is received from the portable terminal 300, the device management apparatus 200 integrally controls the interoperable electronic devices including the specific electronic devices as a group.

The device management apparatus 200 may collect the device information of the electronic devices connected to it, manage the collected information as aggregation information, and generate the group information based on the aggregation information. Specifically, the device management apparatus 200 may aggregate the device information of diverse electronic devices into the aggregation information for identifying interoperable electronic devices and generate the group information on the identified electronic devices. If a request for controlling a specific electronic device is received from the portable apparatus 300, the device management apparatus 200 may collect the device information of the electronic devices connected to it and check other electronic devices interoperable with the specific electronic device to generate the group information on the interoperable electronic devices in real time.

If a request for controlling a specific electronic device is received from the portable terminal 300, the device management apparatus 200 may request the device information on the electronic devices connected to it and the group information generated based on the device information, from the cloud server 400. Once the group information is received from the cloud server 400, the device management apparatus may control the interoperable electronic devices including the specific electronic device as a group.

Figure 11:
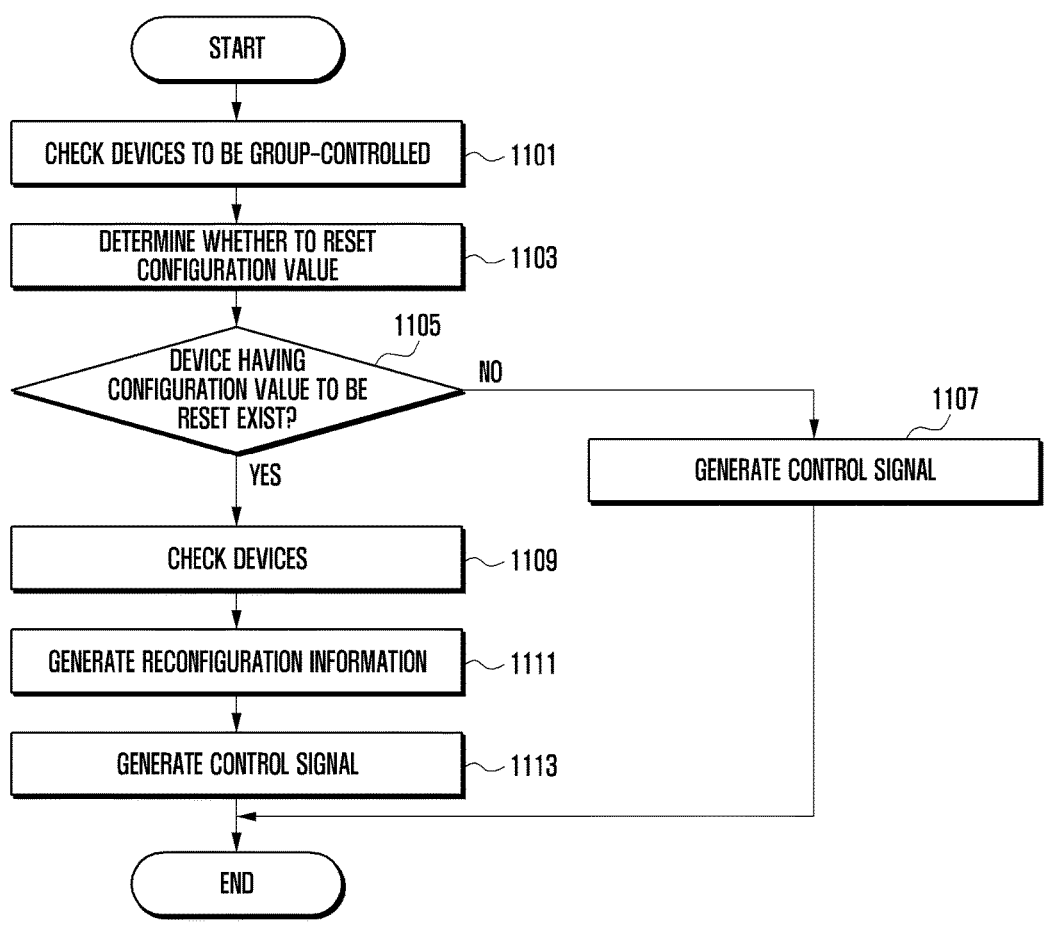
FIG. 11 is a flowchart illustrating a device management method, according to an embodiment of the present invention.

FIG. 11 is a flowchart illustrating a device management method, according to an embodiment of the present invention.

FIG. 11 is directed to an embodiment of the present invention in which the device management apparatus 200 checks the changes of the configuration values of the electronic devices, and controls the electronic devices according to the checking result in the group information-based group control mode. According to an embodiment of the present invention, the configuration values of the electronic devices are values configured uniquely for the operations of the functions of the respective electronic devices. For example, a TV may be set with a configuration value indicating the sound output path to the internal speakers as default. If the TV is interoperable with an external speaker system, the device management apparatus 200 may reset the configuration value of the sound output path to external speaker system to integrally control the TV and the external speaker as a group.

Referring to FIG. 11, the device management apparatus 200 identifies the electronic devices interoperable as a group based on the group information, at step 1101. The device management apparatus 200 checks the configuration values of the electronic devices, at step 1103. The device management apparatus 200 determines whether there is any device of which a configuration value is necessary to be changed or reset, at step 1105. The configuration value change necessity determination is made in such a way that the device management apparatus 200 checks the properties of the interoperable electronic devices and determines whether there are electronic devices having the same properties. For example, both the TV and external speaker system have the sound output functions. This means that one of the TV and external speaker system can be selected for sound output. The electronic device 200 may discriminate among the priorities of the electronic devices having the same or similar functions. For example, the external speaker system may have a priority higher than the internal speaker of the TV for sound output of the TV in group control mode.

According to an embodiment of the present invention, the device management apparatus 200 may give highest priority to the electronic device selected by the user for group control. For example, if the user triggers a control event for controlling a function of the TV, the device management apparatus 200 acquires the group information on the electronic devices interoperable with the TV and configures the TV with the highest priority.

If it is determined that there is no device of which a configuration value is necessary to be changed, the device management apparatus 200 generates the control signal for controlling the respective electronic devices indicated by the group information, at step 1107.

If it is determined that there is a device of which a configuration value is necessary to be changed, the device management apparatus 200 checks the electronic device to be reconfigured among the electronic devices indicated by the group information, at step 1109. Assuming that the group information indicates the device group of the TV, the DVD player, and the external speaker system, the device management apparatus 200 may select the TV as the electronic device of which the configuration value is to be changed for outputting the TV sound through the external speaker system having the high priority as compared to the internal speaker of the TV.

The device management apparatus 200 generates reconfiguration information for reconfiguring the configuration value of at least one electronic device as reconfiguration target electronic device, at step 111.

The device management apparatus 200 generates a control signal for integrally controlling the electronic devices indicated by the group information as a group, at step 1113. The control signal addressed to the electronic device to be reconfigured may include the reconfiguration information. Specifically, the device management apparatus 200 generates a control signal including reconfiguration information for controlling the reconfiguration target electronic device, and sends it and other control signals for controlling the other electronic devices interoperable with the reconfiguration target electronic device. Thus, two types of control signals that are discriminated among each other depending on whether the reconfiguration information is included. Once the control signal including the reconfiguration information is received, the electronic device reconfigures the internal configuration value and operates according to the control signal.

Assuming a situation in which the TV, the DVD player, and the external speaker system interoperate with each other, the device management apparatus 200 may select a configuration value for interoperation between the TV and the external speaker system by switching the sound output path to the external speaker system, such that the TV sound is output through the external speaker system. Also, the device management apparatus 200 may select a configuration value for interoperation between the TV and DVD player by switching the display mode of the TV to a movie mode. Under this group control of the device management apparatus 200, the sound output path configuration value and the display mode value are reset to "external speaker output" and "movie mode", respectively. A group of heating devices (e.g., a heater, a boiler, and an electric heating floor) may be group controlled. In this case, the target temperatures of the electronic devices may be reset under the group control of the device management apparatus 200. Also, the electronic cleaner and audio player may be group-controlled in such a way that volume of the audio player increases when the electronic cleaner operates.

According to an embodiment of the present invention, the configuration values for the electronic devices interoperating with each other under group control may be included in the device information of the respective electronic devices and reset by referencing the device information including predefined configuration values. The configuration value preset operation is described in greater detail below.

Figure 12:
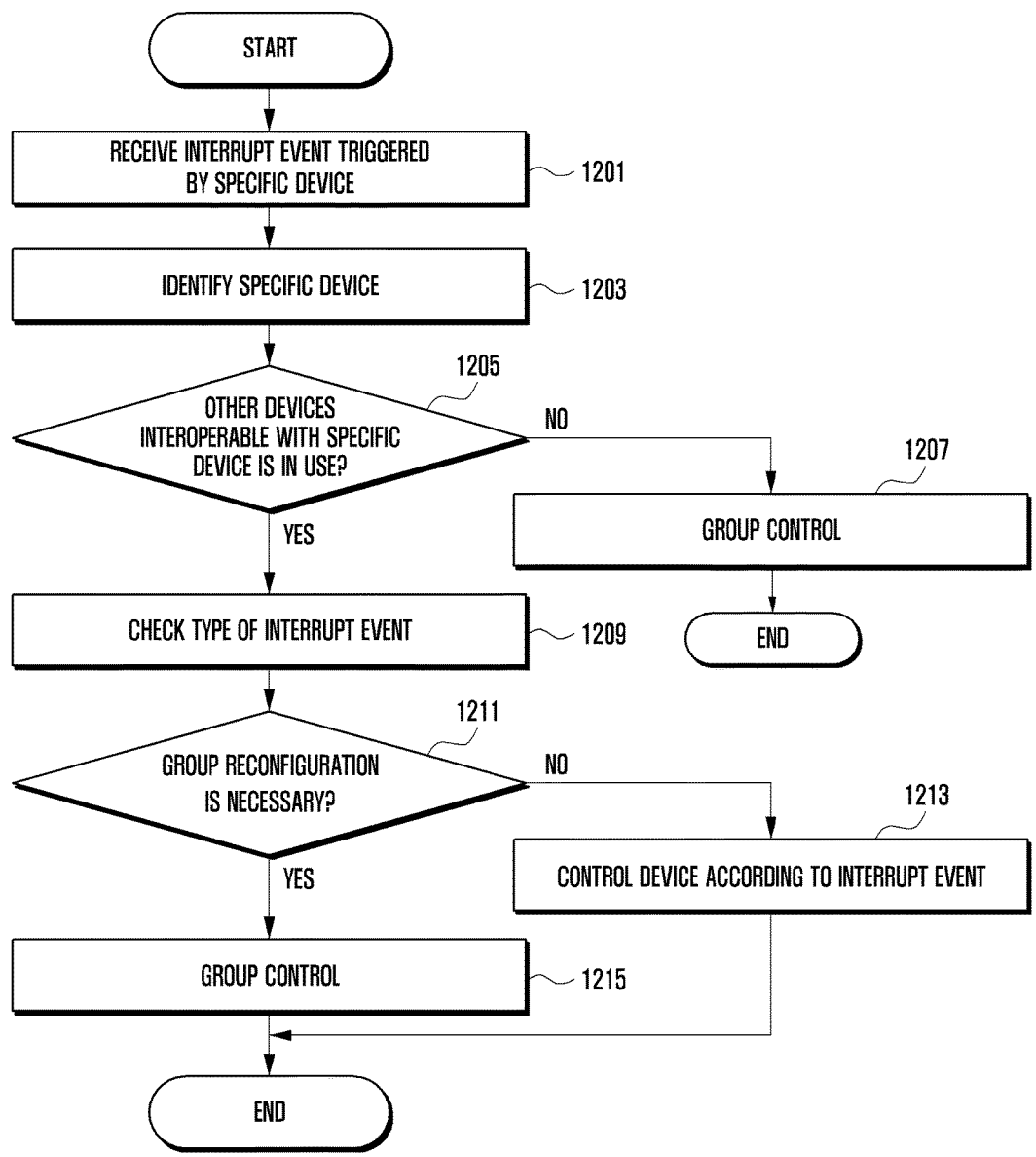
FIG. 12 is a flowchart illustrating a device management method, according to an embodiment of the present invention.

FIG. 12 is a flowchart illustrating a device management method, according to an embodiment of the present invention.

FIG. 12 is directed to an embodiment in which, if a user takes an action to control a specific electronic device directly so as to generate an interrupt, the device management apparatus 200 checks the electronic devices interoperable with the specific electronic device based on the group information corresponding to the interrupt, and takes an action for integrally controlling the interoperable electronic devices including the specific electronic device as a group.

Referring to FIG. 12, the device management apparatus 200 may receive an interrupt event addressed to a specific electronic device, at step 1201. For example, the user may take an action for controlling a specific electronic device directly so as to trigger an interrupt. The specific electronic device detects the interrupt triggered by the user input and sends the interrupt event to the device management apparatus 200. The interrupt event may include the device information on the specific electronic device and the control command corresponding to the interrupt (e.g., information on the function to be executed according to the interrupt).

If the interrupt event is received from a specific electronic device, the device management apparatus 200 identifies the electronic device, which has sent the interrupt event, at step 1203. According to an embodiment of the present invention, the device management apparatus 200 identifies the specific electronic device by referencing the device information included in the interrupt event.

The device management apparatus 200 determines whether there are any active device among the electronic devices interoperable with the specific electronic device, at step 1205. For example, when the interrupt event is received from the specific electronic device, the device management apparatus 200 may check the electronic devices interoperable with the specific electronic device based on the group information and determine whether there are any electronic devices in active state.

If it is determined that there are no interoperable electronic device in active state, the device management apparatus 200 generates a control signal for integrally controlling the electronic devices interoperable with the specific electronic device as a group, at step 1207.

If it is determined that there is at least one interoperable electronic device in active state, the device management apparatus 200 checks the type of the interrupt event, at step 1209. Specifically, the device management apparatus 200 may analyze the interrupt event to determine the type of the interrupt event for controlling the specific electronic device.

The device management apparatus 200 determines where it is necessary to reconfigure the device group based on the group information according to the type of the interrupt event, at step 1211. For example, if the type of the interrupt event is a device-specific interrupt event, the device management apparatus 200 determines that the device group is not necessary to be reconfigured. If the type of the interrupt event is a group-specific interrupt event, the device management apparatus 200 determines that the device group is necessary to be reconfigured.

If it is determined that it is necessary to reconfigure the device group, the device management apparatus 200 executes the function of the electronic device according to the interrupt event, at step 1213. Specifically, the device management apparatus 200 controls only the specific electronic device according to the device-specific interrupt event. In an embodiment of the present invention having interoperation among the TV, DVD player, and external speaker system, the user may generate a volume control interrupt using a remoter controller or volume buttons of the TV. The TV sends an interrupt event corresponding to the interrupt to the device management apparatus 200 such that the device management apparatus 200 controls the TV volume without influence to the operations of the DVD player and the external speaker system.

If it is determined that it is not necessary to reconfigure the device group, the device management apparatus 200 controls the electronic devices as a group according to the interrupt event, at step 1215. According to an embodiment of the present invention, the group control may include the control to the specific electronic device as the target of the interrupt event, the control to other electronic devices changed by the control to the specific electronic device, and the control to the electronic devices grouped according to the group information generated according to the interrupt event target electronic device control.

In an embodiment of the present invention with interoperation among the TV, DVD player, and external speaker system, the user may take a control action to trigger an interrupt for turning-off the TV by manipulating a TV remote controller or the power button of the TV. The TV sends an interrupt event corresponding to the interrupt to the device management apparatus 200, such that the device management apparatus 200 integrally controls turning off of the TV, DVD layer, and external speaker system as a group, according to the interrupt event.

In the embodiment of the present invention with interoperation among the TV, DVD player, and external speaker system, the user also may take a control action to trigger an interrupt event for turning-on an audio player by manipulating an audio player remote controller. The audio player sends an interrupt event corresponding to the interrupt to the device management apparatus 200, such that the device management apparatus 200 determines to reconfigure the device group by adding the audio player as a new member. At this time, the device management apparatus 200 acquires the group information on the audio player according to the interrupt event, and identifies whether the audio player is interoperable with other electronic device (e.g., external speaker system) based on the group information. Here, it is assumed that the audio player is interoperable with the external speaker system. The device management apparatus 200 may control the electronic devices (e.g., the audio player and the external speaker system) belonging to the group reconfigured based on the newly acquired group information, according to the interrupt event. For example, if an interrupt event is detected, the device management apparatus 200 may control such that the electronic devices belonging to the new device group (i.e., the audio player and the external speaker system) turn on while the electronic devices (e.g., the TV and the DVD player) belonging to the old device group, but not the new device group, turn off. The device management apparatus 200 may control the electronic device (e.g., the audio player) as a target of the interrupt event to turn on so as to interoperate with the external speaker system.

Figure 13:
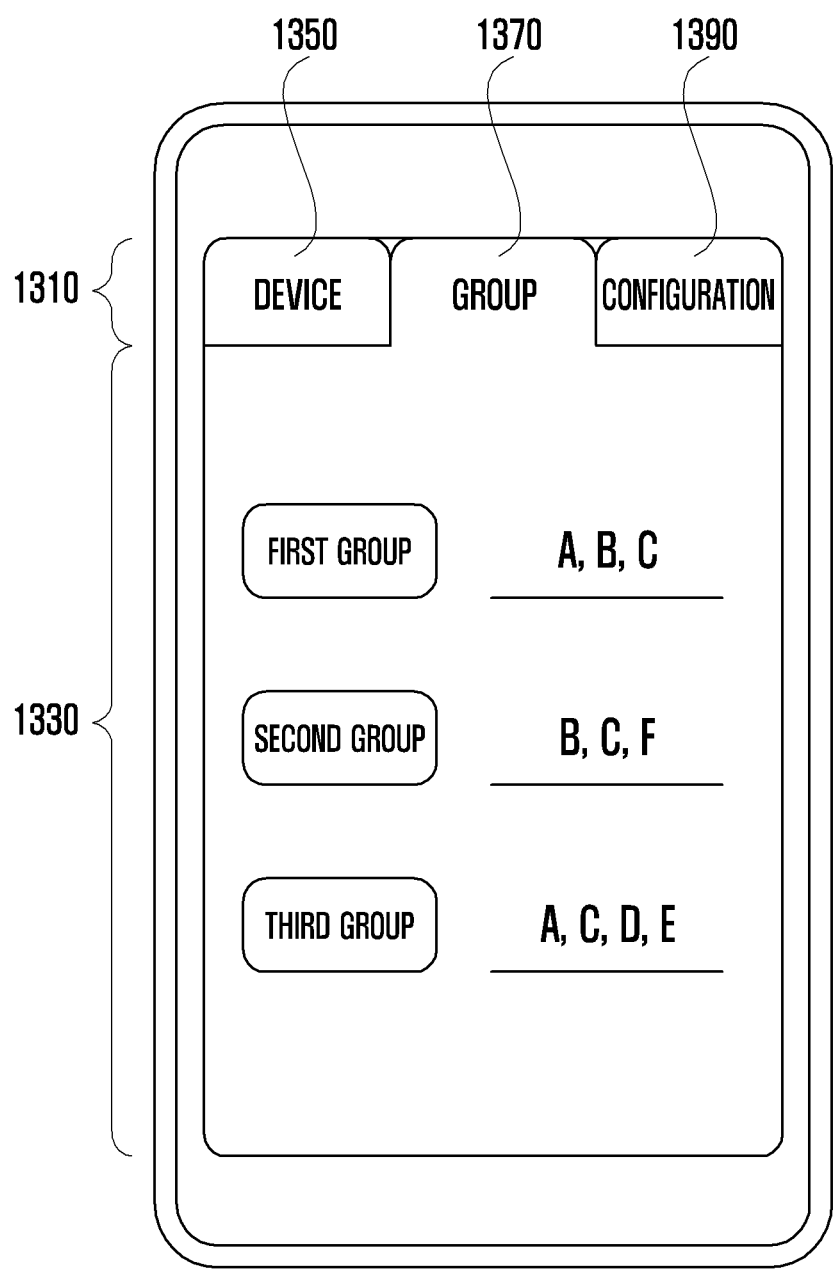
FIGS. 13 to 15 are diagrams illustrating user interfaces for use in the device management system, according to an embodiment of the present invention.
Figure 14:
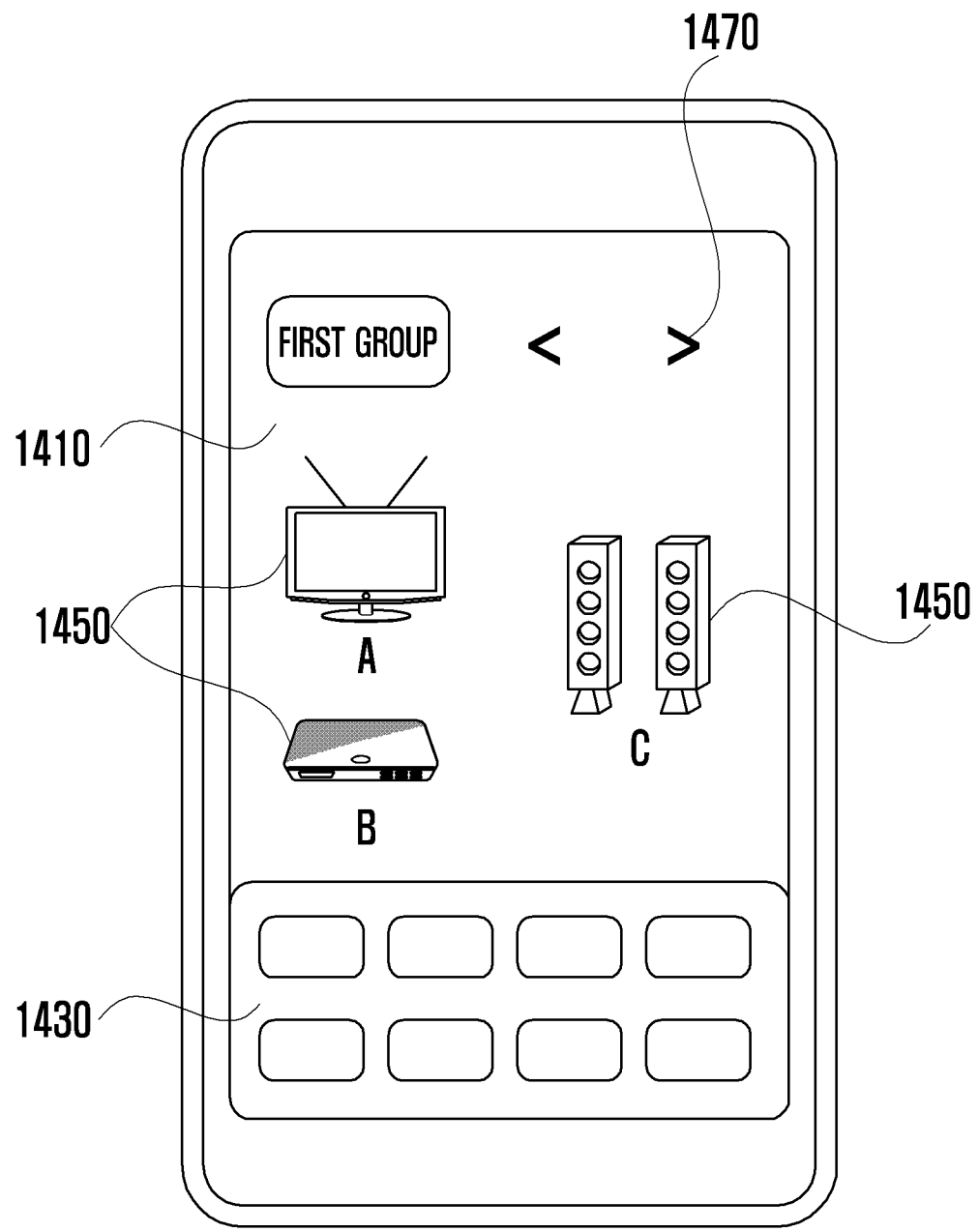
Figure 15:
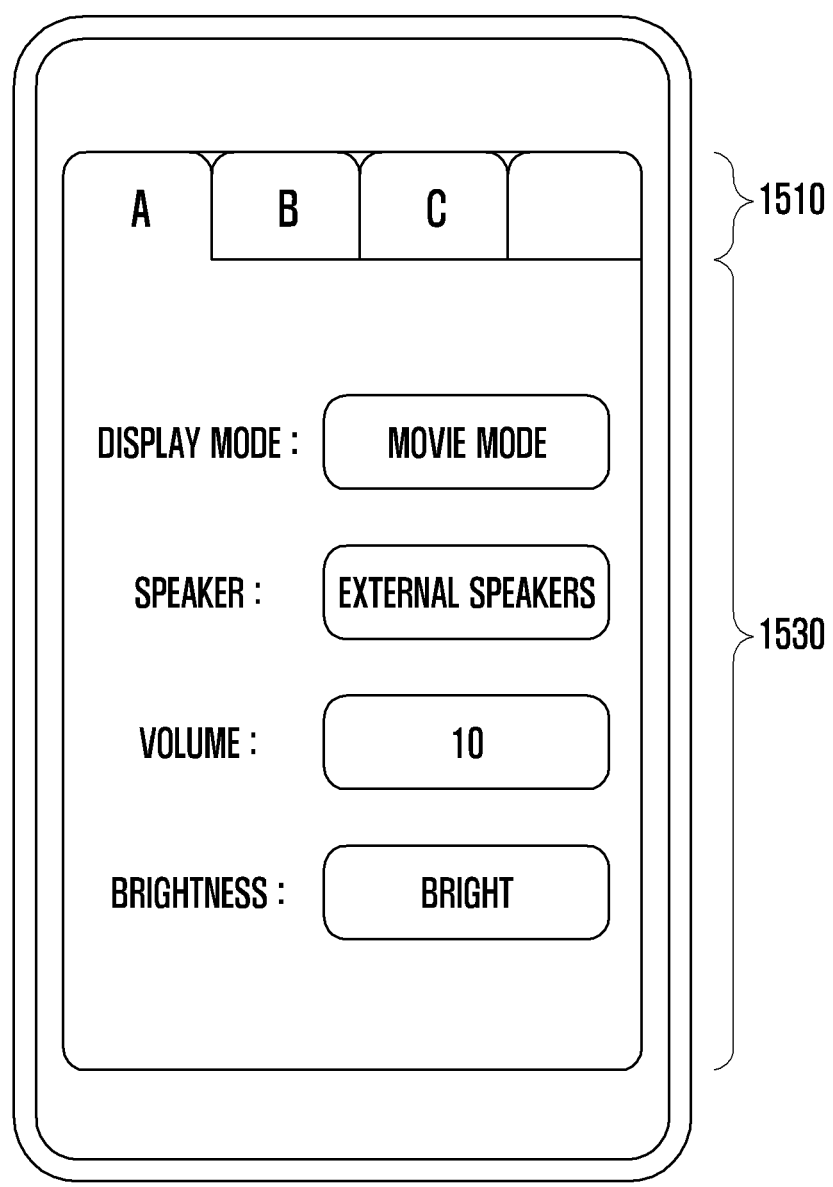

FIGS. 13 to 15 are diagrams illustrating user interfaces for use in the device management system, according to an embodiment of the present invention.

Although FIGS. 13 to 15 are directed to the user interfaces of the portable terminal 300, the user interfaces may be provided by the device management apparatus 200.

FIG. 13 shows a user interface providing the user with a list of device groups (hereinafter, referred to as a first user interface), according to an embodiment of the present invention. FIG. 14 shows a user interface providing the user with a list of the electronic devices constituting a specific device group and enabling the user to reconfigure the device group (hereinafter, referred to as a second user interface), according to an embodiment of the present invention. FIG. 15 shows a user interface enabling the user to reset the configuration values of an electronic device in group control mode (hereinafter, referred to as a third user interface), according to an embodiment of the present invention. The user interface may be provided by means of the display unit 240 of the device management apparatus 200 or the display unit of the portable terminal 300.

As shown in FIG. 13, the first user interface is provided with a category region 1310 and a display region 1330 for displaying the page related to the category selected in the category region 1310. The category region 1310 is composed of a plurality of category tabs. In FIG. 13, the category region 1310 is composed of an electronic device tab 1350 for opening the device list page, a group tab 1370 for opening the device group list page, and a configuration tab 1390 for opening the device configuration page. FIG. 13 shows an embodiment in which the group tab 1370 is selected, such that the device group list page is displayed on the screen.

In FIG. 13, the device group list page shows the device group list including three device groups (a first group, a second group, and a third group). Each group includes the corresponding interoperable electronic devices. In FIG. 13, the electronic devices are denoted by A, B, C, D, E, and F. The electronic devices may be represented by characters or image icons.

In FIG. 13, if the electronic device tab 1350 is selected by the user, the device list page showing the electronic devices connected to the device management apparatus 200 is displayed. If the configuration tab 1390 is selected, the device configuration page with configuration menu items is displayed. If a group is selected on the device group list page presented in display region 1330, a detailed group configuration page is displayed, as shown in FIG. 14.

The second user interface of FIG. 14 shows the detailed group configuration page opened by selecting a device group (e.g. the first group) on the group list page of the first user interface. As shown in FIG. 14, the second user interface includes a group region 1410, informing of the selected group and electronic devices belonging to the selected group, and an configuration region 1430 for providing items representing the electronic devices connected to the device management apparatus 200.

The group region 1410 may show objects 1450 representing the electronic devices belonged to the selected group (e.g., devices A, B, and E belonging to the first group). For example, the TV may be represented by a TV image (or icon or text), and the DVD player by a DVD player image (or icon or text). Accordingly, the user can identify the electronic devices (e.g., A, B, and E) belonging to the corresponding group through the group region 1410. The group region 1410 may further present a group switching item 1470 for switching between device groups.

The configuration region 1430 presents the items of the electronic devices connected to and managed by the device management apparatus 200. The configuration region 1430 may be displayed in response to a user's call. For example, if the user selects the first group item in FIG. 13, the second user interface may be provided with only the group region having the objects representing the electronic devices belonging to the first group, without the configuration region 1430. The configuration region 1430 may appear as overlaid on the group region in response to a user request.

The user may configure the group displayed in the group region 1410 through the configuration region 1430. Specifically, the user may change the electronic devices belonging to the corresponding group (e.g., the first group). For example, the user may remove an electronic device from the corresponding group by dragging the object representing the corresponding electronic device from the group region 1410, and dropping the object onto the configuration region 1430. The user also may add a new electronic device to the corresponding group by dragging an object representing the electronic device from the configuration region 1430, and dropping the object onto the group region 1410. In this way, the user may generate the group information for integrally controlling the electronic devices belonging to the same group.

In FIG. 14, the user may call a detailed device configuration page allowing reset (or reconfiguration) of the basic configuration values of an electronic device by selecting the object 1450 representing the electronic device in the group region 1410. FIG. 15 shows a detailed device configuration page.

The third user interface of FIG. 15 provides the detailed device configuration page presented by selecting an object representing a specific electronic device in the group region 1410 on the second user interface. As shown in FIG. 15, the third user interface is provided with a device tab region 1510, including a plurality tabs representing the electronic devices, and a function configuration region 1530 for displaying function items related to the electronic device selected by means of the corresponding tab. The user can identify the electronic devices intuitively with the device tabs in the device tab region 1510 and reset the configuration values of the electronic device selected by means of the corresponding device tab on the on the function configuration region 1530.

The function configuration region 1530 presents the function items of the electronic device (e.g., device A) selected through the device tab region 1510. For example, if the tab representing the TV is selected in the device tab region 1510, the function configuration region 1530 presents the option items for configuring the functions of the TV. The user may reset the configuration values of the functional options for group control of the electronic devices (e.g., devices B and C) interoperable with the TV in the function configuration region 1530. For example, in TV-centric group control situation, the function configuration region 1530 for the TV may include "display mode," "speaker," "volume," and "brightness" option items, such that the user may change (or configure) the respective option items. For example, the user may set the display mode item to movie mode, the speaker item to the external speaker, the volume item to 10, and the brightness item to bright. The option items may be preset to default values and reset by the user.

The detailed option configurations of each electronic device may be included in the device information for use in group control. Whether to reset the configuration value in group control of the electronic devices may be determined depending on the preset configuration values. The configuration values used in group control of the electronic devices are included in the device information and stored at least one of the portable terminal 300 and device management apparatus 200 depending on which manage the group information.

FIGS. 16 to 19 are diagrams illustrating message formats for use in the device management system, according to an embodiment of the present invention.

Figure 16:
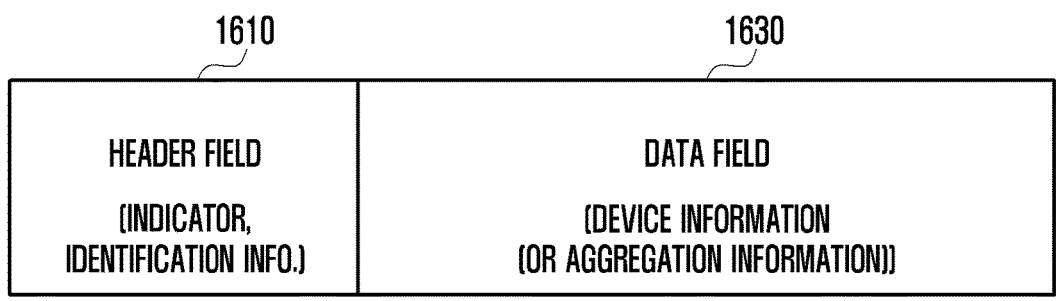
FIGS. 16 to 19 are diagrams illustrating message formats for use in the device management system, according to an embodiment of the present invention.

FIG. 16 shows a format of the group information request message transmitted from the portable terminal 300 or the device management apparatus 200 to the cloud server 400, according to an embodiment of the present invention. FIG.

Figure 18:
Figure 19:
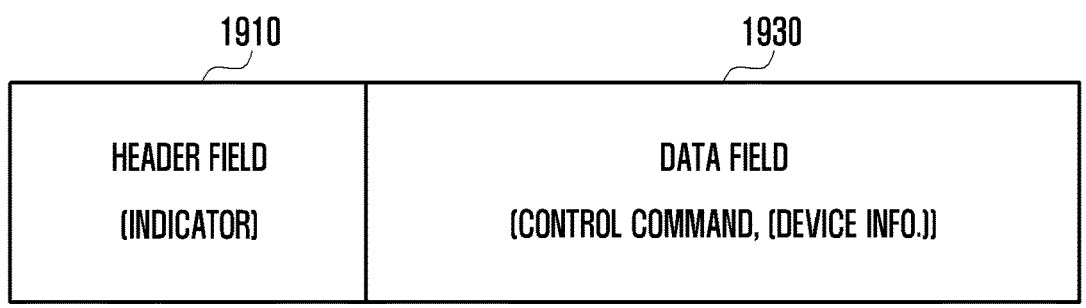

17 shows a format of the group control request message transmitted from the portable terminal 300 to the device management apparatus 200, according to an embodiment of the present invention. FIG. 18 shows a format of the device control request message transmitted from the portable terminal 300 to the device management apparatus 200, according to an embodiment of the present invention. FIG. 19 shows a format of the function control message transmitted from the device management apparatus 200 to the electronic devices belonging to a specific device group, according to an embodiment of the present invention.

As shown in FIG. 16, the group information request message transmitted from the portable terminal 300 or the device management apparatus 200 to the cloud server 400 may include a header field 1610 and a data field 1630. The header field 1610 may include a type indicator for indicating the message type of the group information request message and an identifier for identifying the sender of the message. The identity information may be the identifier of the portable terminal 300 or the device management apparatus 200. The data field 1630 may include the device information (aggregation information) on the respective electronic devices for which the group information is generated.

If the group information request message is received from the portable terminal 300 or the device management apparatus 200, the cloud server 400 checks the type indicator to identify the type of the message. The cloud server 400 may configure at least one device group by referencing the device information carried in the data field 1630 and generate the group information on the at least one group. Afterward, the cloud server 400 may check the identity information of the header field 1610 to transmit the group information to the portable terminal 300 or the device management apparatus 200 identified by the identity information.

Figure 17:
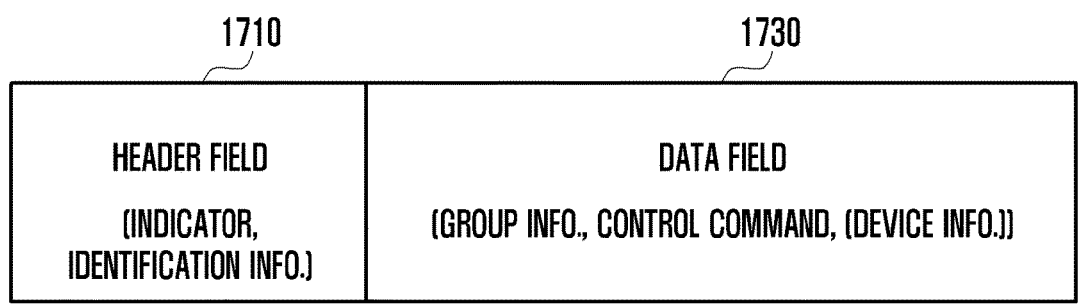

As shown in FIG. 17, the group control request message transmitted from the portable terminal 300 to the device management apparatus 200 includes a header field 1710 and a data field 1730. The header field 1710 may include a type indicator for indicating the message type of the group control request message and an identifier for identifying the portable terminal 300 as the sender of the message. According to an embodiment of the present invention, the identifier is used for authenticating the portable terminal 300 and may be omitted in the group control message. The data field 1730 may include the group information on the electronic devices to be group-controlled and a control command for controlling the function of the electronic devices of the group. The data field 1730 also may include the device information having option configuration values of at least one electronic device for use in group control of the electronic devices.

If the group control message is received from the portable terminal 300, the device management apparatus 200 checks the indicator of the header field 1710 to identify the type of the message. The device management apparatus 200 may check the group information of the data field 1730 to generate a control signal for group-controlling the electronic devices and send the control signal to the electronic devices indicated in the group information. The device management apparatus 200 may check the device information including option configuration values in the data field 1730 and send the control signal including the option configuration values for a specific electronic device indicated in the group information.

As shown in FIG. 18, the device control request message transmitted from the portable terminal 300 to the device management apparatus 200 includes a header field 1810 and a data filed 1830. The header field 1810 may include a type indicator for indicating the message type of the device control request message and an identifier for identifying the sender of the message. According to an embodiment of the present invention, the identifier is used for authenticating the portable terminal 300 and may be omitted in the device control message. The data field 1830 may include the device information on the electronic devices to be controlled and a control command for controlling the function of the electronic device.

If the device control message is received from the portable terminal 300, the device management apparatus 200 checks the indicator of the header field 1810 to identify the type of the message. The device management apparatus 200 may acquire the group information on the electronic devices interoperable with the corresponding electronic device based on the device information carried in the data field 1830. The device management apparatus 200 also may generate a control signal for group-controlling the electronic devices by referencing the acquired group information and send the control signal to the electronic devices indicated in the group information. The device management apparatus 200 may check the device information of the respective electronic devices in the group information to identify the electronic device of which option configuration value is included and send the control signal including the option configuration value to the corresponding electronic device.

As shown in FIG. 19, the function control message transmitted from the device management apparatus 200 to the individual electronic devices may include a header field 1910 and a data field 1930. The header fielder 1910 may include a type indicator for indicating the message type of the function control message carrying control command. The data field 1930 may include the control command for controlling a specific function of the corresponding electronic device. The data field 1930 also may include option configuration value for updating the option of the corresponding electronic device in performing the function according to the control command.

If the function control message is received from the device management apparatus 200, each electronic device may check the type indicator to identify the function control message. Each electronic device 100 may check the control command of the data field 1930 to perform the corresponding function. If the data field 1930 includes an option configuration value, the electronic device 100 may reconfigure the corresponding option with the option configuration value and execute the function according to the control command.

As described above, the device management method and system of the embodiments of the present invention is capable of controlling a plurality of electronic devices as a group based on the group information acquired internally or externally. The function of the device management apparatus 200 for group-controlling the electronic devices may be managed and operated by the respective electronic devices. The group control may be executed through interoperation among the electronic devices 100. For example, when the TV is performing a specific function in response to a user request, the TV may check the electronic devices interoperable with it based on the preconfigured group information and may integrally control the identified electronic devices as a group.

As described above, the device management method and system of embodiments of the present invention are capable of configuring a plurality of interoperable electronic devices into at least one group and integrally controlling the electronic devices per group. Also, the device management method and system of the present invention is capable of reducing a number of repetitive manipulations for controlling a plurality of electronic devices, resulting in improved user convenience. Also, the device management method and system of the embodiments of the present invention are capable of generating customized group information based on the device information of the electronic devices, resulting in improved control reliability.

The device management method and system of the embodiments of the present invention are capable of facilitating grouping a plurality of electronic devices that are interconnected through a network (e.g. a home network, or an office network), and integrally controlling the electronic devices belonging to the same group.

The device management method and system of the embodiments of the present invention are capable of group-controlling a plurality of electronic devices interoperable in a specific environment (e.g., a home, an office, a hospital, or a factory). Also, the device management method and system of the embodiments of the present invention are capable of implementing an optimal environment for group-controlling the electronic devices interoperable in various environments. Furthermore, the device management method and system of the embodiments of the present invention are capable of controlling a plurality of electronic devices interconnected through a network more efficiently in group-wise manner, resulting in improved user convenience and device utilization.

The device management system and method for controlling the electronic devices interconnected through a home network, according to embodiments of the present invention, can be recorded in a computer-readable storage media in the form of program commands executable by various types of computing means. Here, the computer-readable storage media can store the program commands, data files, and data structures independently or in the form of their combination. The program commands recorded in the storage media can be designed and configured for dedicated use in the embodiments of the present invention, or those well-known to those in the computer software field.

The computer-readable media may be magnetic media such as a hard disk, a floppy disk and magnetic tape, optical media such as a compact disk read-only memory (CD-ROM) and a DVD, magneto-optical media such as floptical disk, and hardware devices such as a ROM, a RAM, a flash memory, etc., particularly implemented to store and execute program commands. The program commands may be machine language codes produced by a compiler and high-level language codes that can be executed by computers using an interpreter, etc. In order to perform the operations of the embodiments of the present invention, the hardware devices may be implemented to operate as at least one software module, and vice versa.

Although embodiments of the invention have been described using specific terms, devices, and methods, such description is for illustrative purposes only. The words used are words of description rather than of limitation.

While the invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method for group-controlling devices, comprising:
  requesting, by a portable terminal over a local network, device information concerning a plurality of electronic devices of different types selected by the portable terminal from a device management apparatus;
  generating, by the device management apparatus, the device information of the selected plurality of electronic devices from information collected by the device management apparatus from each of the selected plurality of electronic devices;
  receiving, by the portable terminal, the device information from the device management apparatus;
  requesting, by the portable terminal over a mobile telecommunications network, group information from a cloud server based on the device information, wherein the cloud server creates a diverse group of interoperable devices by selecting from among the plurality of electronic devices of different types selected by the portable terminal, based on their interoperability amongst themselves and then generates the group information from the created diverse group of interoperable devices;
  receiving, by the portable terminal over the mobile telecommunications network, the group information on the diverse group of interoperable devices from the cloud server;
  transmitting, from the portable terminal to the device management apparatus, the group information on the diverse group of interoperable devices;
  configuring, by the device management apparatus, the diverse group of interoperable devices to perform the same action as a group based on the group information; and
  controlling, by the device management apparatus, the diverse group of interoperable devices, when a control event for controlling the diverse group of interoperable devices is received from the portable terminal, by transmitting control signals to each of the diverse group of interoperable devices, wherein each of the diverse group of interoperable devices receives a control signal according to a type of the receiving device,
  wherein, when an interrupt occurs in one or more of the diverse group of interoperable devices, at least one of (i) the device management apparatus reconfigures the diverse group of interoperable devices to perform the same action as a group based on the interrupt, (ii) the cloud server is requested to create a new diverse group of interoperable devices based on the interrupt, and (iii) the portable terminal selects a new plurality of electronic devices of different types based on the interrupt.

2. A system, comprising:
  a portable terminal capable of:
    requesting device information from a device management apparatus concerning a plurality of electronic devices of different types selected by the portable terminal;
    receiving the device information from the device management apparatus;
    requesting, by the portable terminal, group information from a cloud server based on the device information;
    receiving the group information on a diverse group of interoperable devices from the cloud server;
    transmitting the group information on the diverse group of interoperable devices to the device management apparatus;
  the cloud server capable of:
    when the request for group information and the device information are received, creating a diverse group of interoperable devices by selecting from among the plurality of electronic devices of different types based on their interoperability amongst themselves, and generating the group information corresponding to the created diverse group of interoperable devices; and the device management apparatus that:

generates, in response to the request for device information from the portable terminal, the device information of the selected plurality of electronic devices from information collected by the device management apparatus from each of the selected plurality of electronic devices;

receives the group information generated by the cloud server from the portable terminal;

configures the diverse group of interoperable devices to perform the same action as a group based on the group information; and when a control event for controlling the diverse group of interoperable devices is received, controls the diverse group of interoperable devices based on the group information as a group by transmitting control signals to each of the diverse group of interoperable devices, wherein each of the diverse group of interoperable devices receives a control signal according to a type of the receiving interoperable device, wherein, when an interrupt occurs in one or more of the diverse group of interoperable devices, at least one of (i) the device management apparatus reconfigures the diverse group of interoperable devices to perform the same action as a group based on the interrupt, (ii) the cloud server is requested to create a new diverse group of interoperable devices based on the interrupt, and (iii) the portable terminal selects a new plurality of electronic devices of different types based on the interrupt.

3. The system of claim 2, wherein the device management apparatus comprises:

a storage unit that stores device information on the plurality of electronic devices and the group information; and a control unit that controls the diverse group of interoperable devices as a group based at least on the group information.

4. The system of claim 2, wherein at least one of the control signals comprises reconfiguration information for resetting an option configuration value of at least one of the diverse group of interoperable devices.

5. The system of claim 2, wherein the device management apparatus determines a type of the control event when a control event is received, controls, when the detected control event is a group control event, the diverse group of interoperable devices indicated in the group information as a group according to the group control event, and controls, when the detected control event is a device control event, a specific device or the diverse group of interoperable devices according to whether a group control mode is deactivated or activated.

6. The system of claim 2, wherein the portable terminal comprises the device management apparatus.

7. The system of claim 2, wherein the device management apparatus comprises the portable terminal.

8. A device management apparatus capable of group-controlling devices, comprising:

an antenna;

a control unit operably connected to the antenna; and a non-transitory machine readable medium operably connected to the control unit and containing one or more programs which when executed by the control unit implement the steps of:

collecting information from a plurality of electronic devices;

generating, in response to a request for device information on a selected plurality electronic devices of different types from among the plurality of electronic devices, the device information from the collected information on each of the selected plurality of electronic devices of different types;

receiving group information on a diverse group of interoperable devices generated by a cloud server, wherein the cloud server, using at least the generated device information, creates the diverse group of interoperable devices by selecting from among the selected plurality of electronic devices of different types, based on their interoperability amongst themselves and then generates the group information concerning the created diverse group of interoperable devices;

configuring the diverse group of interoperable devices to perform the same action as a group based on the group information; and controlling, when a control event for controlling the diverse group of interoperable devices is received, the diverse group of interoperable devices by transmitting control signals to each of the diverse group of interoperable devices, wherein each of the diverse group of interoperable devices receives a control signal according to a type of the receiving interoperable device, wherein, when an interrupt occurs in one or more of the diverse group of interoperable devices, at least one of (i) the device management apparatus reconfigures the diverse group of interoperable devices to perform the same action as a group based on the interrupt, (ii) the cloud server is requested to create a new diverse group of interoperable devices based on the interrupt, and (iii) the portable terminal selects a new plurality of electronic devices of different types based on the interrupt.

9. The device management apparatus of claim 8, further comprising:

a storage unit that stores device information on the plurality of electronic devices of different types and group information on at least one group composed of a plurality of devices.

10. The device management apparatus of claim 8, wherein the device management apparatus comprises the portable terminal.

11. A portable terminal capable of group-controlling devices, comprising:

a control unit; and a non-transitory machine readable medium containing one or more programs which when executed by the control unit implement the steps of:

requesting device information concerning a plurality of electronic devices of different types selected by the portable terminal from a device management apparatus;

receiving the device information from the device management apparatus, where the device management apparatus generates the device information of the selected plurality of electronic devices of different types from information collected by the device management apparatus from each of the selected plurality of electronic devices;

requesting, from a cloud server, group information based on the device information of the selected plurality of electronic devices of different types;

receiving, from the cloud server, the group information on a diverse group of interoperable devices, wherein the cloud server, using at least the device information, creates the diverse group of interoperable devices by selecting from among the selected plurality of electronic devices of different types based on their interoperability amongst themselves and then generates the group information from the created diverse group of interoperable devices; and transmitting the group information on the diverse group of interoperable devices generated by a cloud server to the device management apparatus, wherein the device management apparatus configures the diverse group of interoperable devices to perform the same action as a group based on the group information, wherein controlling the diverse group of interoperable devices indicated in the group information as a group is performed by transmitting control signals to each of the diverse group of interoperable devices, wherein each of the diverse group of interoperable devices receives a control signal according to a type of the receiving interoperable device, wherein at least one of the portable terminal and the device management apparatus performs the controlling, and wherein, when an interrupt occurs in one or more of the diverse group of interoperable devices, at least one of (i) the device management apparatus reconfigures the diverse group of interoperable devices to perform the same action as a group based on the interrupt, (ii) the cloud server is requested to create a new diverse group of interoperable devices based on the interrupt, and (iii) the portable terminal selects a new plurality of electronic devices of different types based on the interrupt.

12. The portable terminal of claim 11, wherein the portable terminal comprises the device management apparatus.

* * * * *